United States Patent
Haltom

(10) Patent No.: US 11,731,580 B2
(45) Date of Patent: Aug. 22, 2023

(54) METHODS AND APPARATUS FOR ACTIVATING MULTIPLE EXTERNAL AIRBAGS

(71) Applicant: Nuro, Inc., Mountain View, CA (US)

(72) Inventor: Marshall Dickens Haltom, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 132 days.

(21) Appl. No.: 17/158,444

(22) Filed: Jan. 26, 2021

(65) Prior Publication Data

US 2021/0245701 A1    Aug. 12, 2021

Related U.S. Application Data

(60) Provisional application No. 62/971,332, filed on Feb. 7, 2020.

(51) Int. Cl.
*B60R 21/36* (2011.01)
*B60R 21/0134* (2006.01)
(Continued)

(52) U.S. Cl.
CPC .......... *B60R 21/36* (2013.01); *B60R 21/0134* (2013.01); *B60W 30/0956* (2013.01);
(Continued)

(58) Field of Classification Search
CPC ................ B60R 21/36; B60R 21/0134; B60R 2021/346; B60W 30/0956;
(Continued)

(56) References Cited

U.S. PATENT DOCUMENTS 7,036,844 B2    5/2006  Hammer et al.
9,802,568 B1 *  10/2017 Larner ................... B60R 21/36
(Continued)

FOREIGN PATENT DOCUMENTS

CN        1730318       2/2006
CN      101743151       6/2010
(Continued)

OTHER PUBLICATIONS

International Search Report and Written Opinion issued in corresponding International Application No. PCT/US2018/044320 dated Oct. 8, 2018.
(Continued)

*Primary Examiner* — Peter D Nolan
*Assistant Examiner* — Anwar Mohamed
(74) *Attorney, Agent, or Firm* — Edell, Shapiro & Finnan, LLC

(57) ABSTRACT

According to one aspect, an overall airbag system of an autonomous vehicle uses a combination of sensors to deploy one or more external airbags in advance of a collision or as a collision occurs, for the purpose of protecting vulnerable persons. By using sensor data, combined with perception and prediction algorithms, an autonomous driving system may deploy a substantially optimal combination of external airbags for a given the size of a vulnerable person, vehicle speed, and/or collision timing. In addition to cushioning impact during a collision, the deployment of multiple external airbags may also control kinematics of vulnerable persons, as for example by addressing brain injuries in pedestrians due to rotational kinematics.

30 Claims, 16 Drawing Sheets

(51) Int. Cl.
  *G06V 20/58* (2022.01)
  *B60R 21/34* (2011.01)
  *B60W 30/095* (2012.01)
  *B60W 60/00* (2020.01)
  *G06V 40/20* (2022.01)
  *G06V 10/764* (2022.01)
  *G06V 10/44* (2022.01)
  *G06V 40/10* (2022.01)

(52) U.S. Cl.
  CPC ....... *B60W 60/0017* (2020.02); *G06V 10/454* (2022.01); *G06V 10/764* (2022.01); *G06V 20/58* (2022.01); *G06V 40/10* (2022.01); *G06V 40/23* (2022.01); *B60R 2021/346* (2013.01); *B60W 2554/4026* (2020.02); *B60W 2554/4029* (2020.02)

(58) Field of Classification Search
  CPC ..... B60W 60/0017; B60W 2554/4026; B60W 2554/4029; G06V 20/58; G06V 40/23
  See application file for complete search history.

(56) References Cited

U.S. PATENT DOCUMENTS

| | | | |
|---|---|---|---|
| 10,029,638 B1* | 7/2018 | Lombrozo | B60R 21/0134 |
| 10,106,124 B1* | 10/2018 | Larner | B60R 21/36 |
| 10,336,290 B1 | 7/2019 | Lazaro et al. | |
| 10,471,927 B1* | 11/2019 | Gupta | B60R 21/36 |
| 10,824,862 B2 | 11/2020 | Qi et al. | |
| 10,882,488 B2 | 1/2021 | Ferguson et al. | |
| 2003/0062208 A1 | 4/2003 | Hamada et al. | |
| 2004/0074688 A1 | 4/2004 | Hashimoto et al. | |
| 2005/0206139 A1 | 9/2005 | Mori et al. | |
| 2008/0202839 A1 | 8/2008 | Satou et al. | |
| 2009/0066069 A1 | 3/2009 | Takahashi et al. | |
| 2009/0084620 A1 | 4/2009 | Matsuura et al. | |
| 2009/0229906 A1 | 9/2009 | Takahashi et al. | |
| 2009/0242308 A1 | 10/2009 | Kitte et al. | |
| 2010/0052294 A1 | 3/2010 | Kim et al. | |
| 2010/0084426 A1 | 4/2010 | Devers et al. | |
| 2010/0148476 A1 | 6/2010 | Inoue et al. | |
| 2010/0156070 A1 | 6/2010 | Takahashi et al. | |
| 2010/0230944 A1 | 9/2010 | Narita et al. | |
| 2010/0244413 A1 | 9/2010 | Hayashi et al. | |
| 2010/0252350 A1 | 10/2010 | Hayashi et al. | |
| 2010/0252351 A1 | 10/2010 | Okamoto et al. | |
| 2010/0269730 A1 | 10/2010 | Horlacher | |
| 2013/0119681 A1 | 5/2013 | Mendis et al. | |
| 2014/0081445 A1 | 3/2014 | Villamar | |
| 2014/0087126 A1 | 3/2014 | Quaderer | |
| 2015/0000994 A1 | 1/2015 | McLundie | |
| 2015/0006005 A1 | 1/2015 | Yu et al. | |
| 2015/0008064 A1* | 1/2015 | Park | B60R 21/36 180/274 |
| 2015/0137492 A1 | 5/2015 | Rao et al. | |
| 2015/0336524 A1 | 11/2015 | Larner et al. | |
| 2015/0367799 A1 | 12/2015 | Le et al. | |
| 2016/0200286 A1 | 7/2016 | Farrington | |
| 2016/0207495 A1 | 7/2016 | Le et al. | |
| 2016/0264087 A1 | 9/2016 | Ohmura | |
| 2016/0355152 A1 | 12/2016 | Perez Garcia et al. | |
| 2017/0113641 A1 | 4/2017 | Thieberger et al. | |
| 2017/0174343 A1 | 6/2017 | Erickson et al. | |
| 2018/0099639 A1* | 4/2018 | Suemune | B60R 21/36 |
| 2018/0162316 A1 | 6/2018 | Saito et al. | |
| 2019/0001919 A1 | 1/2019 | Farooq et al. | |
| 2019/0054876 A1 | 2/2019 | Ferguson et al. | |
| 2020/0172041 A1 | 6/2020 | Dix | |
| 2020/0269791 A1* | 8/2020 | Rhoden | B63B 43/00 |
| 2021/0229622 A1 | 7/2021 | Baccouche et al. | |
| 2021/0229623 A1* | 7/2021 | Kwon | B60R 21/2338 |

FOREIGN PATENT DOCUMENTS

| | | | | |
|---|---|---|---|---|
| CN | 102781731 | | 11/2012 | |
| CN | 109278696 | | 1/2019 | |
| DE | 102011015914 A1 | * | 10/2012 | ......... B60R 21/0134 |
| EP | 0958969 B1 | | 8/2003 | |
| EP | 1652740 A2 | | 5/2006 | |
| GB | 2344080 A | | 5/2000 | |
| JP | H06189610 A | | 7/1994 | |
| JP | 2006240351 A | | 9/2006 | |
| WO | 2008062128 A1 | | 5/2008 | |
| WO | 2017072679 A1 | | 5/2017 | |

OTHER PUBLICATIONS

International Search Report and Written Opinion issued in International Application No. PCT/US2018/044361 dated Oct. 10, 2018.

Mizukura, Taiji; Machine Translation of JP-06189610-A; Jul. 1994; espacenet.com (Year: 1994).

Examination Report in corresponding European Application No. 18756040.4, dated Oct. 30, 2020, 6 pages.

* cited by examiner

METHODS AND APPARATUS FOR ACTIVATING MULTIPLE EXTERNAL AIRBAGS

PRIORITY CLAIM

This application claims the benefit of priority under 35 U.S.C. § 119 to U.S. Provisional Application No. 62/971,332, entitled "METHODS AND APPARATUS FOR ACTIVATING MULTIPLE EXTERNAL AIRBAGS," filed on Feb. 7, 2020, the entirety of which is incorporated herein by reference.

TECHNICAL FIELD

The disclosure relates to providing safety mechanisms for vehicles to protect pedestrians. More particularly, the disclosure relates to providing external airbags for autonomous vehicles.

BACKGROUND

Vehicles are often faced with obstacles as the vehicles navigate roads. Obstacles generally include pedestrians who may choose to cross into the path of a vehicle without regard for their own safety. The ability for vehicles such as autonomous vehicles to avoid collisions with obstacles is crucial to protect pedestrians. However, there may be unavoidable collisions that may arise when an autonomous vehicle may not reasonably avoid impact with a pedestrian. In such cases, the ability to protect a pedestrian as much as possible during a collision is critical.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
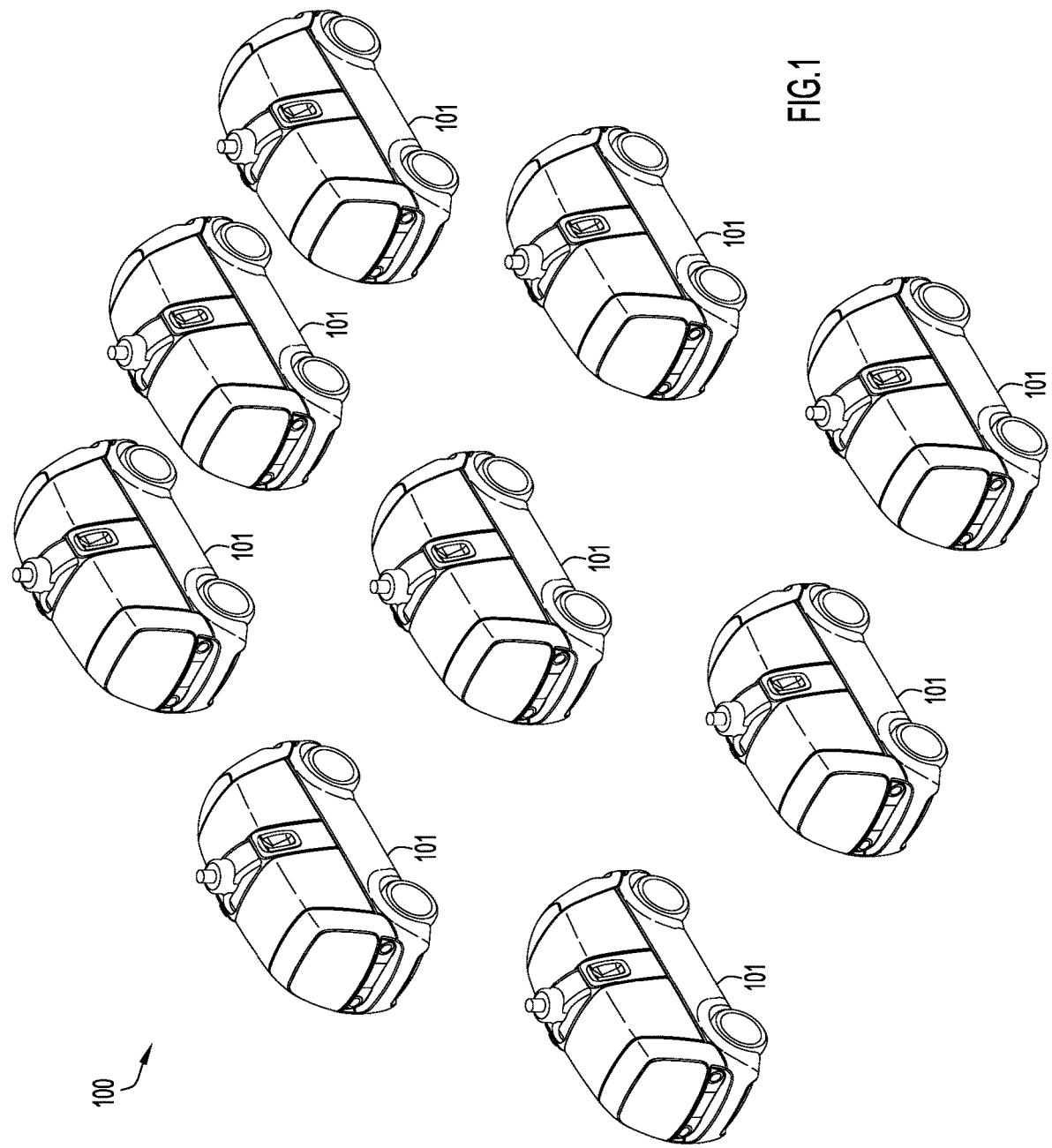
FIG. 1 is a diagrammatic representation of an autonomous vehicle fleet, according to an example embodiment.

In one embodiment, an overall airbag system of an autonomous vehicle uses a combination of sensors to deploy one or more external airbags in advance of a collision or as a collision occurs, for the purpose of protecting vulnerable persons, e.g., pedestrians. By using sensor data, combined with perception and prediction algorithms, an autonomous driving system of an autonomous vehicle may deploy a substantially optimal combination of external airbags for a given size of a vulnerable person, vehicle speed, and/or collision timing. In addition to cushioning impact during a collision, the deployment of multiple external airbags may also control kinematics of vulnerable person, for example, to address potential brain injuries in persons due to rotational kinematics.

For example, in one embodiment, a computer-implemented method is provided that may include detecting, by an autonomous vehicle, an object with which a collision is to occur; determining a deployment configuration for one or more external airbags of the autonomous vehicle based on one or more dimensions of the object; and deploying the one or more external airbags for the autonomous vehicle based on the deployment configuration.

In another embodiment, another computer-implemented method is provided that may include detecting, by an autonomous vehicle, an object with which a collision is to occur; determining a deployment configuration for one or more external airbags of the autonomous vehicle based on one or more dimensions of the object; and deploying the one or more external airbags for the autonomous vehicle based on the deployment configuration.

DETAILED DESCRIPTION

As vehicles such as autonomous vehicles navigate roadways, the vehicles may encounter vulnerable persons, such as pedestrians or cyclists (e.g., bicyclists, motorcyclists, etc.). The ability to reduce the chances that a vulnerable person suffers a significant injury in the event of a collision between a vehicle and the vulnerable person is critical.

By deploying external airbags intended to cushion impact when a vehicle collides with a vulnerable person, the injury outcomes of the vulnerable person may be improved. In one embodiment, multiple external airbags may be located on an exterior of a vehicle, and may be selectively deployed depending upon the characteristics of a vulnerable person with which the vehicle is either about to collide or is in the process of colliding. For example, for a pedestrian that is determined to be taller than a certain height threshold, one deployed airbag may cushion the head of the pedestrian to substantially control the head and neck kinematics of the pedestrian, while another deployed airbag may cushion the thorax and the abdomen of the pedestrian.

As referred to herein, the term "external airbag" may include any airbag can be configured for/integrated onto/into an exterior of an autonomous vehicle and that can be deployed along one or more exterior portions of the autonomous vehicle.

Example embodiments that may be used to implement the features and functionality of this disclosure will now be described with more particular reference to the accompanying figures. When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate," etc.) should be understood as indicating values very near to those that accompany the aforementioned term. That is to say, a deviation within reasonable limits from an exact value should be accepted because a skilled person in the art will understand that such a deviation from the values indicated is inevitable due to measurement inaccuracies, etc. The same applies to the terms "about" and "around" and "substantially." Similarly, when used herein, the term "comprises" and its derivations (such as "comprising," etc.) should not be understood in an excluding sense, that is, these terms should not be interpreted as excluding the possibility that what is described and defined may include further elements, steps, etc. Further, each example embodiment is described herein as illustrative and is not to be construed as a preferred or advantageous embodiment, but rather as one example or illustration of a possible embodiment.

For example embodiments discussed herein, reference may be made to the spatial relationships between various components and to the spatial orientation of various aspects of components as depicted in the attached drawings. However, as will be recognized by those skilled in the art, the devices, components, members, apparatuses, etc. described herein may be positioned in any desired orientation. Thus, the use of terms such as "above," "below," "upper," "lower," "top," "bottom," and/or any other similar terms that can be used to describe spatial relationships between various components or to describe the spatial orientation of aspects of such components, should be understood to describe a relative relationship between the components or a spatial orientation of aspects of such components, respectively, as the components described herein may be oriented in any desired direction.

Multiple airbags may be positioned on exteriors of autonomous vehicles that are part of a vehicle fleet. Referring initially to FIG. 1, an autonomous vehicle fleet 100 will be described according to an example embodiment. The autonomous vehicle fleet 100 includes a plurality of autonomous vehicles 101, or robot vehicles. Autonomous vehicles 101 are manned or unmanned mobile machines that are generally arranged to transport and/or to deliver people, cargo, items, and/or goods, whether on land or water, air, or another surface, such as a car, wagon, van, tricycle, truck, bus, trailer, train, tram, ship, boat, ferry, drove, hovercraft, aircraft, spaceship, etc.

Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

Figure 2:
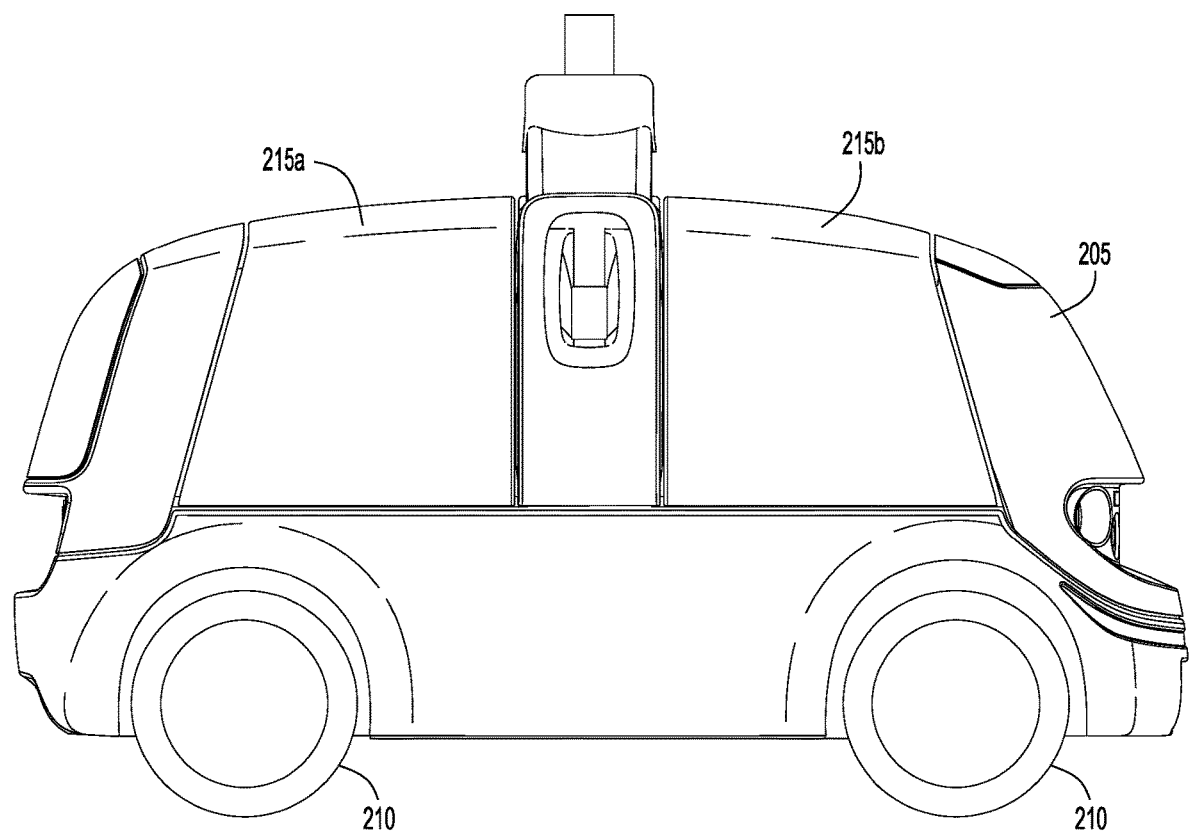
FIG. 2 is a diagrammatic representation of a side of an autonomous vehicle, according to an example embodiment.

As will be discussed in more detail below, each autonomous vehicle 101 may include a power system, a propulsion or conveyance system, a navigation module, a control system or controller, a communications system, a processor, and a sensor system FIG. 2 is a diagrammatic representation of a side of an autonomous vehicle, e.g., one of autonomous vehicles 101 of FIG. 1, according to an example embodiment. Autonomous vehicle 101, as shown, is a vehicle configured for land travel. Typically, autonomous vehicle 101 includes physical vehicle components such as a chassis or a body 205, as well as conveyance mechanisms 210, e.g., wheels. In one embodiment, autonomous vehicle 101 may be relatively narrow, e.g., approximately two to approximately five feet wide, and may have a relatively low mass and relatively low center of gravity for stability.

Autonomous vehicle 101 may be arranged to have a working speed or velocity range of between approximately one and approximately forty-five miles per hour (mph), e.g., approximately twenty-five miles per hour, to accommodate inner-city and residential driving speeds. In some embodiments, autonomous vehicle 101 may have a substantially maximum speed or velocity in range between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

Autonomous vehicle 101 includes a plurality of compartments (e.g., compartments 215a and 215b). Compartments 215a and 215b may be assigned to one or more entities, such as one or more customer, retailers, and/or vendors. Compartments 215a and 215b are generally arranged to contain cargo, items, and/or goods. Typically, compartments 215a and 215b may be secure compartments. The compartments 215a and 215b may have different capabilities, such as refrigeration, insulation, etc., as appropriate. It should be appreciated that the number, size, and/or configuration of compartments 215a and 215b may vary. That is, although two compartments (215a and 215b) are shown, autonomous vehicle 101 may include more than two or less than two (e.g., zero or one) compartments.

In some instances, chassis or body 205 may be implemented as a modular body portion that can be attached and detached, mechanically and/or electrically, to or from conveyance mechanisms 210, propulsion components, etc. for autonomous vehicle 101. In this manner, chassis or body 205 can be interchangeable among different conveyance mechanisms 210, propulsion components, etc.

Figure 3:
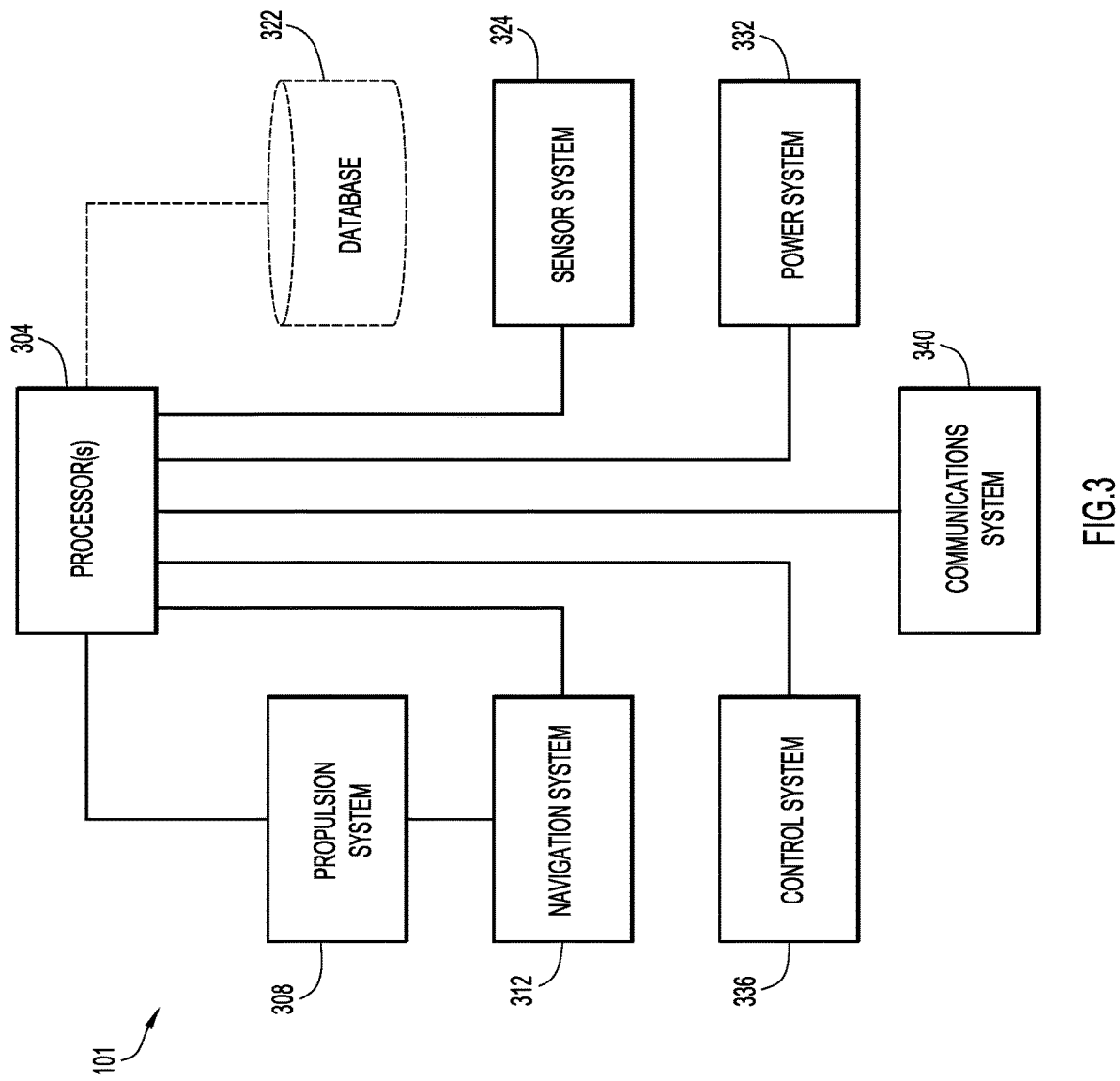
FIG. 3 is a block diagram representation of an autonomous vehicle, according to an example embodiment.

FIG. 3 is a block diagram representation of the autonomous vehicle 101, according to an example embodiment. With reference to FIGS. 2 and 3, the autonomous vehicle 101 includes one or more processor(s) 304, a propulsion system 308, a navigation system 312, a sensor system 324, a power system 332, a control system 336, and a communications system 340. It should be appreciated that processor(s) 304, propulsion system 308, navigation system 312, sensor system 324, power system 332, and communications system 340 are operatively coupled to and configured and/or integrated with, the body 205 (FIG. 2) of the autonomous vehicle 101 and generally cooperate to operate the autonomous vehicle 101.

Processor(s) 304 is/are operatively coupled and configured to send instructions to and to receive instructions from or for various components such as propulsion system 308, navigation system 312, sensor system 324, power system 332, and control system 336. In some embodiments, processor(s) 304 may additionally be operatively coupled to a database (DB) 322.

Propulsion system 308, or a conveyance system, is arranged to cause autonomous vehicle 101 to move, e.g., drive. For example, when autonomous vehicle 101 is configured with a multi-wheeled automotive configuration as well as steering, braking systems and a propulsion engine, propulsion system 308 may be arranged to cause the engine, wheels, steering, and braking systems to cooperate to drive the autonomous vehicle. The propulsion engine may be a gas engine, a turbine engine, an electric motor, and/or a hybrid gas and electric engine. As would be appreciated by a person of ordinary skill in the art, the propulsion system 308 may be configured as a drive system and may include additional or different components suitable or desirable for conveying an object, which are now known or hereafter developed, such as one or more axels, wheels, treads, wings, rotors, blowers, rockets, propellers, brakes, etc.

Although the autonomous vehicle 101 shown in FIGS. 1 and 2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

Navigation system 312 may be configured to control propulsion system 308 and/or provide guidance to an operator associated with the autonomous vehicle 101 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes one or more sensors configured to view and/or monitor conditions on or around the autonomous vehicle 101. The sensors, may include for example cameras (e.g., running at a high frame rate, akin to video), light detection and ranging (LiDAR) sensors, radar sensors, ultrasonic sensors, microphones, altimeters, accelerometers, pressure sensors, environmental sensors, piezoelectric sensors, and/or the like. Sensor system 324 generally includes onboard sensors, which allow autonomous vehicle 101 to safely navigate the autonomous vehicle 101 (via the navigation system 315), and to ascertain when there are objects near autonomous vehicle 101. For example, sensor system 324 may detect vulnerable persons such as pedestrians, cyclists, etc. and collect data relating to the vulnerable persons. In one embodiment, sensor system 324 may include propulsion systems sensors that monitor drive mechanism performance, drive train performance, and/or power system levels. The sensor system 324 also may include one or more microphones configured to detect sounds external to the autonomous vehicle 101, such as a siren from an emergency vehicle requesting a right-of-way, a honk from another vehicle, a verbal communication (e.g., a yell, etc.) from a person, etc.

Power system 332 is arranged to provide power to autonomous vehicle 101. Power may be provided as electrical power, gas power (liquid or non-liquid gas), or any other suitable power, e.g., solar power, fuel cell power, or battery power. In one embodiment, power system 332 may include a main power source, and an auxiliary power source that may serve to power various components of autonomous vehicle 101 and/or to generally provide power to autonomous vehicle 101 when the main power source does not does not have the capacity to provide sufficient power.

Communications system 340 allows autonomous vehicle 101 to communicate, as for example, wirelessly, with a fleet management system (not shown) or device/system that allows autonomous vehicle 101 to be controlled from a location remote from the autonomous vehicle. Communications system 340 generally obtains or receives data, stores the data, and transmits or provides the data to a fleet management system and/or to autonomous vehicles 101 within a fleet, such as fleet 100. The data may include, but is not limited to including, information relating to scheduled requests or orders, information relating to on-demand requests or orders, and/or information relating to a need for autonomous vehicle 101 to reposition itself, e.g., in response to an anticipated demand, information regarding an operational or mechanical need or behavior of the autonomous vehicle 101, information regarding an upcoming construction zone or other hazard in the path of the autonomous vehicle 101, etc. In some embodiments, communications system 340 may allow autonomous vehicle to communicate with one or more persons. In various embodiments, the communications system 340 can be configured to enable communication via wireless local area access network communications/functionality (e.g., Wi-Fi®), wireless wide area access network communications/functionality (e.g., cellular), and/or any other wireless or mobile communication capability now known or hereafter developed In some embodiments, control system 336 may cooperate with processor(s) 304 to determine where autonomous vehicle 101 may safely travel, and to determine the presence of objects in a vicinity around autonomous vehicle 101 based on data (e.g., results/measurements/etc. from sensor system 324 and/or from an external system (not shown) communicating with the autonomous vehicle 101 via the communications system 340). In other words, control system 336 may cooperate with processor(s) 304 to function as an autonomous driving system that effectively determines what autonomous vehicle 101 may do within its immediate surroundings. Control system 336 in cooperation with processor(s) 304 may essentially control power system 332 and navigation system 312 as part of driving or conveying autonomous vehicle 101. In this sense, the control system 335 manages autonomous control of the autonomous vehicle 101.

Additionally, control system 336 may cooperate with processor(s) 304 and communications system 340 to provide data to or obtain data from other autonomous vehicles 101, a management server, a global positioning server (GPS), a personal computer, a teleoperations system, a smartphone, or any computing device via the communication system 340. In general, control system 336 may cooperate at least with processor(s) 304, propulsion system 308, navigation system 312, sensor system 324, and power system 332 to allow autonomous vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

The database 322 includes data stores or storage structures (e.g., files, databases, data structures, data or other repositories, etc.) that are configured to store information. In an example embodiment, the database 322 is configured to store information regarding the autonomous vehicle 101, jobs/tasks assigned to, and/or performed by, the autonomous vehicle 101, software for the autonomous vehicle 101, characterization information for characterizing one or more objects detected by autonomous vehicle 101, etc. In one example, the database 322 can include logged information collected by one or more of the systems of the autonomous vehicle 101 during operation of the autonomous vehicle 101. In some embodiments, one or more memory element(s) (not shown in FIG. 3) may also be included for the autonomous vehicle 101, which may overlap in whole and/or in part with DB 322 to facilitate the storage of various information, data, etc. for use in various operations discussed herein.

In one embodiment, autonomous vehicle 101 may be substantially outfitted with multiple airbags, e.g., pedestrian airbags. Sensor system 324 may detect the presence of an object that may be determined to be a human object (e.g., a person such as a pedestrian, cyclist, etc.), and may cooperate with control system 336 to cause one or more airbags to deploy to cushion an impact of the person with autonomous vehicle 101 in the event that a collision with the human object is imminent or otherwise unavoidable. In some instances, a human object can include a whole of a human object (e.g., an entire person) or a portion of a human object (e.g., one or more arms, legs, etc. of a person). The multiple airbags may be positioned along the exterior of autonomous vehicle 101 such that the airbags may be selectively deployed based on the characteristics of the person with whom a collision is either imminent or in the process of occurring.

Figure 4:
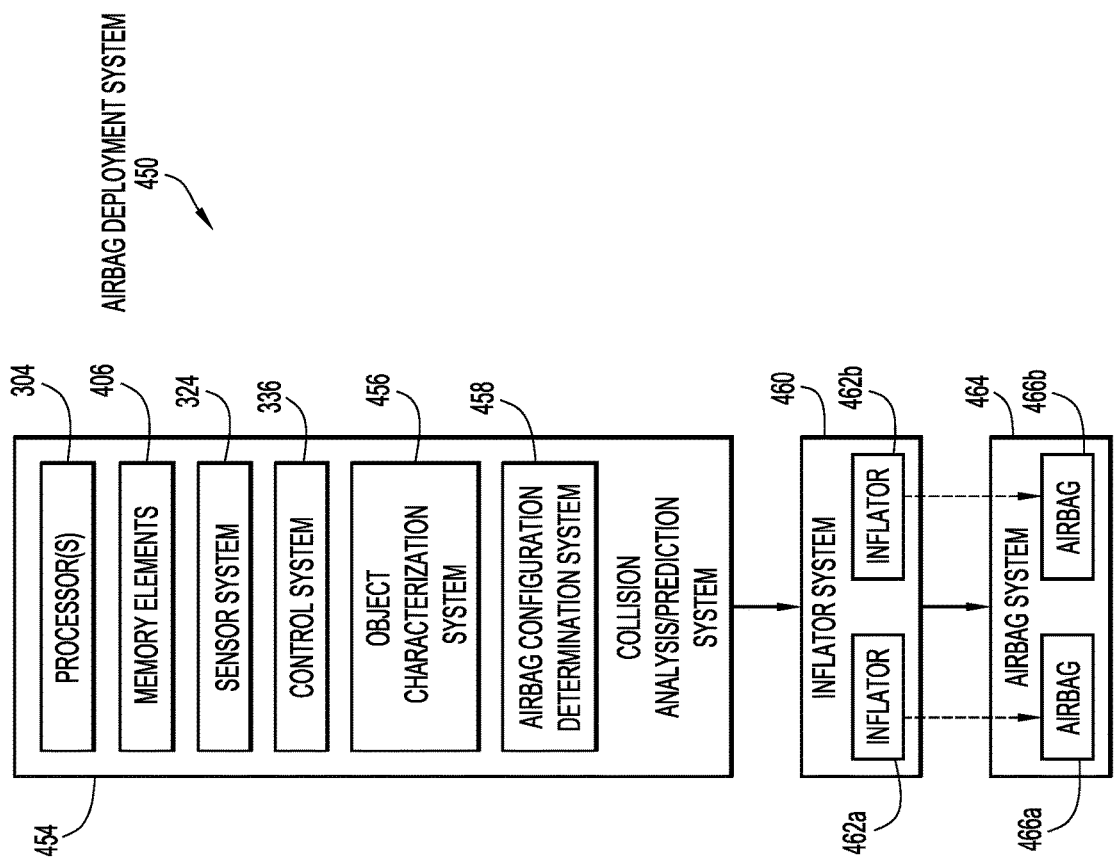
FIG. 4 is a block diagram representation of functional components that facilitate multiple airbags to be selectively deployed, according to an example embodiment.

FIG. 4 is a block diagram representation of functional components that facilitate multiple airbags to be selectively deployed, according to an example embodiment. An overall airbag deployment system 450 may be included on a vehicle, e.g., an autonomous vehicle such as autonomous vehicle 101 of FIGS. 2 and 3. Airbag deployment system 450 includes a collision analysis/prediction system 454, an inflator system 460, and an airbag system 464.

Collision analysis/prediction system 454 is generally arranged to detect the presence of an object with which a collision is imminent or otherwise unavoidable, and to determine a configuration for the deployment of one or more of airbags 466a, 466b of airbag system 464. Collision analysis/prediction system 454 includes processor(s) 304, sensor system 324, and control system 336 of FIG. 3, as well as one or more memory element(s) 406, an object characterization system 456, and an airbag configuration determination system 458. Sensor system 324 detects the presence of an object such as a pedestrian and generally collects data related to the object. Object characterization system 456 characterizes the object based at least in part upon the data collected by sensor system 324. Characterizing the object may include, but is not limited to including, identifying an object type, identifying a height of the object, identifying a width of the object, etc. Airbag configuration determination system 458 uses an object characterization, also referred to herein as "characterization information," identified by object characterization system 456 to determine a configuration for airbags 466a, 466b of airbag system 464. That is, airbag configuration determination system 458 identifies which airbags 466a, 466b of airbag system 464 are to be deployed to mitigate any damage to the object, e.g., injuries to a pedestrian, and/or to autonomous vehicle 101 when a collision occurs. In various embodiments, characterization information may be stored via any combination of memory element(s) 406 and/or DB 322 to facilitate various operations discussed herein.

In some embodiments, a suitable airbag configuration can be determined based on an object characterization that identifies one or more dimensions of an object but does not indicate whether the object is a human object or a non-human object.

For example, the airbag configuration determination system 458 can determine that one or more dimensions for the object satisfy (e.g., are greater than, less than, equal to, within a certain range or ranges, etc.) one or more dimensional thresholds that trigger the airbag configuration determination system 458 to determine a deployment configuration for one or both of airbags 466a, 466b. Consider in one instance, for example, that object characterization system 456 obtains two-dimensional (2D) and/or 3-dimensional (3D) sensor data from one or more sensors of sensor system 324 (e.g., image data from one or more optical cameras, infrared (IR) cameras, and/or the like, depth/distance data from one or more LiDAR sensors, etc.) and characterizes an object with which an imminent or unavoidable collision is to occur in order to determine a height of the object. For example, 2D image data can be obtained by the object characterization system 456 from one or more sensors of sensor system 324. Utilizing the 2D image data, which may be red-green-blue (RGB) data, IR data, etc., an object with which a collision is to occur can be identified and a 2D boundary can be overlaid onto object that identifies a vertical region defining the height of the object and/or a horizontal region defining the width of the object.

In one instance, airbag configuration determination system 458 can determine a suitable configuration of airbags 466a and/or 466b for deployment based on the height of the object (e.g., based on whether the object height is taller or shorter than one or more height thresholds, based on whether the object is height is within a threshold height range, etc.). It is to be understood that any combination of object dimensions may be utilized to determine a suitable configuration of airbags 466a and/or 466b for deployment.

In some embodiments, object characterizations may also include determining a type of an object with which an imminent collision is to occur such that an object type may be utilized along with one or more object dimensions may also be used to determine suitable deployment configurations for one or more of airbags 466a and 466b. For example, object characterization system 456 may utilize any combination of multidimensional analysis, machine learning, deep learning, artificial intelligence, and/or the like now known or hereafter developed in order to generate object characterizations/characterization information that characterize an object type for one or more objects with which a collision is imminent or otherwise unavoidable by autonomous vehicle 101.

In some instances, sensors of sensor system 324 can perform multiple scans of the object space in the direction of travel the autonomous vehicle 101 in order to generate object characterizations/characterization information that characterize one or more objects with which a collision is imminent or otherwise unavoidable.

In some instances, object characterization system 456 may utilize measurements/data obtained from sensor system 324 to generate, analyze, and extract information from point cloud data to characterize one or more objects. In one example, point cloud data may be utilized as images, such as depth maps or rasterized data, which can be analyzed using a convolutional neural network (CNN) for segmentation and characterization of one or more objects detected by sensor system 324. In another example, voxelized point cloud data can be analyzed/converted into volumetric grids or generalized image CNNs can be analyzed/converted into 3D CNNs to characterize one or more objects detected by sensor system 324.

In yet another example, 2D and 3D sensor data can be utilized to characterize one or more objects, as prescribed at least by commonly assigned U.S. Pat. No. 10,824,862, issued on Nov. 3, 2020, entitled "Three-Dimensional Object Detection For Autonomous Robotic Systems Using Image Proposals," which is incorporated by reference herein in its entirety. For example, 2D image data can be obtained by the object characterization system 456 from one or more sensors of sensor system 324, such as one or more optical cameras, IR cameras, and/or the like. Utilizing the 2D image data (e.g., red-green-blue (RGB) data, IR data, etc.), an attention region can be identified that contains an object of interest. In some instances, an attention region can include a 2D boundary overlaid onto 2D image data that describes a horizontal and vertical region of the object of interest.

Additionally, 3D depth data (e.g., a sparse point cloud, a dense depth map, etc.) can be obtained from a depth sensor of sensor system 324, such as one or more LiDAR sensors, a stereo camera, or a time of flight sensor. A 3D frustum can be extracted from the 3D depth data corresponding to the attention region. A deep learning model can be applied to the 3D frustum to generate and regress an oriented boundary for the object of interest and the object of interest can be characterized (e.g., classifying object type, determining height, width, size, etc.) based on a combination of features (e.g., geometric features) from the attention region of the 2D image data and the 3D depth data within and around the regressed boundary.

In various instances, a deep learning model can include a PointNet, a 3D CNN on voxelized volumetric grids of a point cloud in the frustum, a 2D CNN on a bird's eye view projection of a point cloud in the frustum, a recurrent neural network on a sequence of 3D points from close to distant, and/or the like. In some instances, generating an object characterization can include performing an object recognition/classification process through which an object type is determined based on geometric features determined for an object within the attention region and comparing the geometric features to a database of stored geometric features (e.g., stored via database 322 and/or memory element(s) 406) that represent human objects (e.g., pedestrians, cyclists, etc.) and non-human objects (e.g., bridge abutments, traffic cones, buildings, etc.) in order to determine/classify objects as human or non-human object types. In some instances, geometric features for human objects can include unobstructed/whole views of a person and/or portions of a person, such as a head, a torso/abdomen, legs, arms, etc.

Consider an example in which sensor system 324 for autonomous vehicle 101 captures 2D image data and 3D depth data for a road along which the autonomous vehicle 101 is driving (e.g., using an optical camera and a depth sensor). In this example, object characterization system 456 generates an attention region in the 2D image data corresponding to a pedestrian that has begun to cross the road in which the pedestrian is partially obstructed from the perspective of the autonomous vehicle 101 by a parked car. The object characterization system 456 can extract a 3D frustum from the depth data corresponding to the attention region in which the frustum encompasses the pedestrian. The object characterization system 456 can then generate and regress an oriented 3D boundary around the whole shape of the pedestrian although the pedestrian is partially hidden behind the parked car, and can classify the pedestrian as a human object based on geometric features determined for the attention region and can also determine one or more characteristics for the human object, such as height, etc. Additionally, features of the human object can be identified, such as the head, abdomen, neck, thorax, arms, legs, etc.

In one example, knowing its speed and an estimated time of collision with the human as well as the characterization of the object as a human object (e.g., height, etc.), the autonomous vehicle 101, via airbag configuration determination system 458 can determine a suitable configuration for airbags 466a and/or 466b to be inflated in order to mitigate potential injuries to the pedestrian with which a collision is imminent or otherwise unavoidable.

Although the above example involves determining that an object is a human object in order to determine a suitable airbag configuration, in some embodiments, a suitable airbag configuration can also be determined based on characterizing an object as a non-human object that has one or more dimensions that satisfy one or more thresholds (e.g., is taller/wider or shorter/narrower than one or more height/width thresholds, is within a threshold height/width range, etc.). Further, although human and non-human objects are discussed for various examples, object characterizations may also indicate or identify whether an object is an animate non-human object or animate non-human object (e.g., an animal, such as a dog, etc.) or an inanimate non-human object (e.g., road debris, etc.), which may further impact airbag configuration determinations in some embodiments.

In still some embodiments, as discussed above, a suitable airbag configuration may be determined based on characteristics indicating one or more dimensions of an object regardless of object type characteristics being determined for one or more object(s).

Airbag configuration determination system 458 may determine a suitable deployment configuration for airbags 466a, 466b to be inflated using any suitable method. In one embodiment, simulations may be used to determine a probability of certain types of injuries that may be incurred by a pedestrian based on simulated forces, moments, and other parameters. For example, simulations with no airbags deployed, simulations with a single airbag inflated, and simulations with multiple airbags inflated may be used to assess probabilities of different types of injuries given particular airbag configurations. Using data collected from simulations, airbag configuration determination system 458 may ascertain a suitable configuration for airbags 466a, 466b that may substantially minimize the likelihood of severe injury to a pedestrian given information such as a height of the pedestrian and a position of the pedestrian relative to a vehicle.

In another embodiment, airbag configuration determination system 458 may determine a suitable configuration for airbags 466a, 466b in order to mitigate potential damage to autonomous vehicle 101 (e.g., for hitting a bridge abutment, etc.) in addition to and/or in lieu of damage/injury to an object with which the autonomous vehicle is to collide. For example, simulations may also be used to determine a probability of certain types and/or extent of damage that may be incurred by autonomous vehicle 101 and/or various systems/components of autonomous vehicle 101 based on different sizes of objects (in lieu of and/or in combination with human injury simulations discussed above, for example). Thus, using data collected from simulations, airbag configuration determination system 458 may determine a suitable configuration for airbags 466a, 466b that may substantially minimize damage to autonomous vehicle 101 in addition to and/or in lieu of potential damage/injury to an object that may be incurred. In various embodiments, a suitable configuration for airbags 466a, 466b may identify one or more pressures to which each airbag 466a, 466b is to be inflated, a time at which to begin inflation of each airbag 466a, 466b, a rate or time at which each airbag 466a, 466b is to be inflated to one or more pressures, combinations thereof, and/or the like.

Control system 336 may obtain configuration information from airbag configuration determination system 458, and may trigger appropriate inflators 462a and/or 462b of inflator system 460 in order to inflate any combination of airbags 466a and/or 466b. Appropriate inflators 462a, 462b are generally inflators 462a, 462b that will cause the appropriate airbags 466a, 466b, i.e., airbags 466a, 466b identified by airbag configuration determination system 458, to deploy. Inflators 462a, 462b may each include a volume of compressed gas, as well as an electronically controlled valve that may be activated by inflator system 460 when a signal is received from control system 336. Activating electronically controlled valves of inflators 462a, 462b may cause inflators 462a, 462b to release compressed gas. In the described embodiment, compressed gas from inflator 462a may be released into airbag 466a, causing airbag 466a to inflate or to deploy. Similarly, compressed gas from inflator 462b may be released into airbag 466b causing airbag 466b to inflate or to deploy. Inflator system 460 may be arranged to control the release of compressed gas from inflators 462a, 462b such that the rate at which airbags 466a, 466b inflate may be substantially controlled.

It should be appreciated that while each inflator 462a, 462b may have an associated airbag 466a, 466b, inflators 462a, 462b may instead each be associated with more than one airbag 466a, 466b. In addition, multiple inflators 462a, 462b may be associated with a single airbag 466a, 466b. Further, although two inflators 462a, 462b have and two airbags 466a, 466b are shown, the number of inflators 462a, 462b and airbags 466a, 466b may vary widely. In other words, airbag deployment system 450 may include more than two inflators 462a, 462b and/or more than two airbags 466a, 466b.

Figure 5:
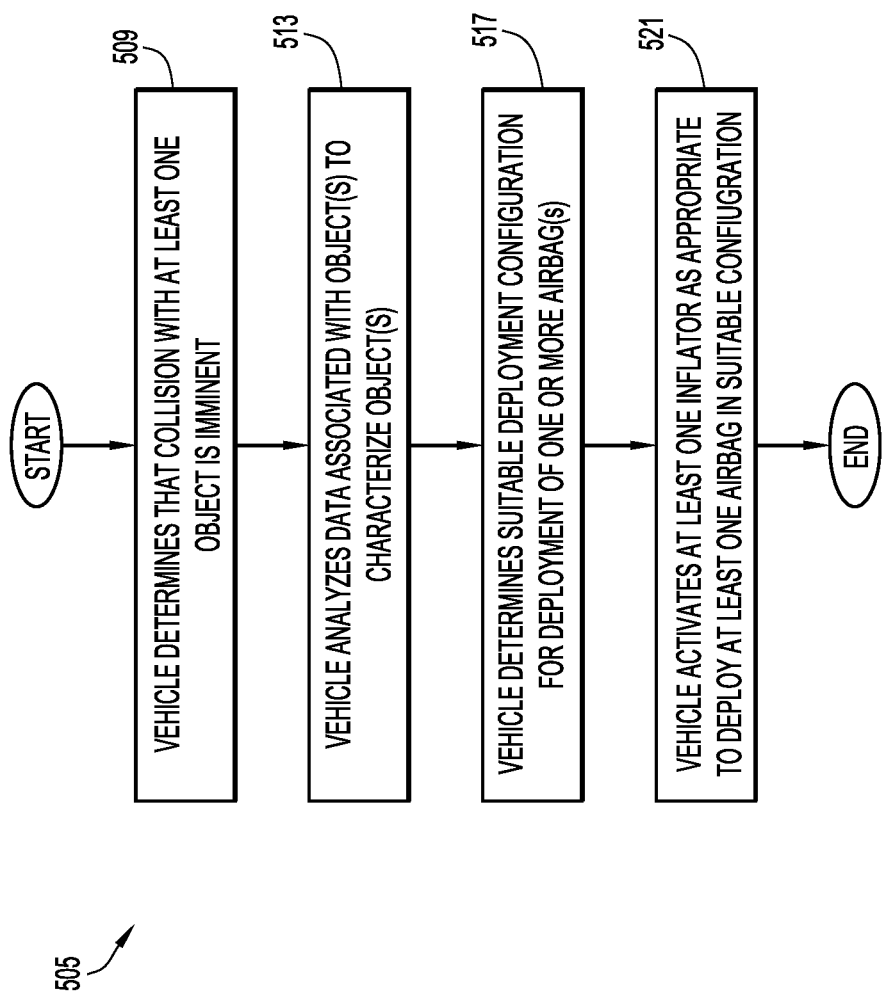
FIG. 5 is a flow chart illustrating an example method for selectively deploying multiple airbags, according to an example embodiment.

FIG. 5 is a flow chart illustrating an example method for selectively deploying multiple external airbags, according to an example embodiment. At least one airbag may be deployed either in advance of an imminent collision or as a collision occurs. The deployment of such an airbag may effectively be timed to allow a desired pressure to be reached within the airbag substantially at a moment of impact, e.g., the airbag may reach a desired inflation pressure just as a vehicle and an object collide. A method 505 of selectively deploying one or more airbags begins at a step 509 in which a vehicle, e.g., an autonomous vehicle such as an autonomous delivery robot vehicle, determines that a collision with at least one object is imminent or otherwise unavoidable. The object may be, in one embodiment, a vulnerable person, such as a pedestrian, cyclist, etc. Such a determination regarding the collision may be made using data collected from sensors associated with the vehicle, as well as perception and prediction algorithms of an autonomous driving system or a collision analysis/prediction system of the vehicle such as collision analysis/prediction system 454 of FIG. 4 (e.g., utilizing any combination of logic, etc. configured for processor(s), sensor system 324, control system 336, etc.).

For example, a collision with an object may be determined to be imminent if the collision is expected to occur in less than a particular threshold of time, and/or if the collision may not be avoided even if the vehicle brakes or steers around the object. In general, a collision may be deemed to be imminent if the collision is unavoidable given a current trajectory of the vehicle, and substantially immediate braking or trajectory adjustment may not be effective to avoid the collision altogether.

Once the vehicle determines that a collision with at least one object is imminent, the vehicle analyzes data collected by sensors with respect to the object(s) to characterize the object(s) in a step 513. By analyzing the data collected from sensors, the object may be characterized. Characterizing the object may include, but not be limited to determining one or more dimensions of the object including a height, width, etc. through the use of an object characterization system such as object characterization system 456 of FIG. 4.

After the vehicle characterizes the object, a suitable deployment configuration for deploying one or more airbag deployment is determined in a step 517. A suitable deployment configuration may effectively specify one or more airbag(s) of multiple airbags to deploy. In general, a suitable configuration may be a configuration that allows for the object to be protected by the airbags during a collision, while substantially reducing any damage to the object as a result of the collision.

The suitable configuration may be determined by an airbag configuration determination system such as airbag configuration determination system 458 as described above with respect to FIG. 4. One method of determining a suitable configuration will be discussed below with reference to FIG. 6.

In a step 521, the vehicle activates at least one inflator to deploy airbags in the suitable configuration. That is, inflators that correspond to airbags that are to be deployed may be actuated to cause those airbags to inflate. The airbags may either be deployed prior to an anticipated collision, i.e., pre-deployed, or deployed as a collision is occurring. After the vehicle activates at least one inflator, the method of deploying multiple airbags is completed.

Thus, broadly, a method may include detecting, by an autonomous vehicle, an object with which a collision is to occur; determining a deployment configuration for one or more external airbags of the autonomous vehicle based on one or more dimensions of the object (e.g., based on characterization(s) of one or more object(s) with which the collision is to occur); and deploying the one or more external airbags for the autonomous vehicle based on the deployment configuration. The deploying may include activating at least one inflator, as appropriate, to deploy at least one airbag based on the deployment configuration.

Figure 6:
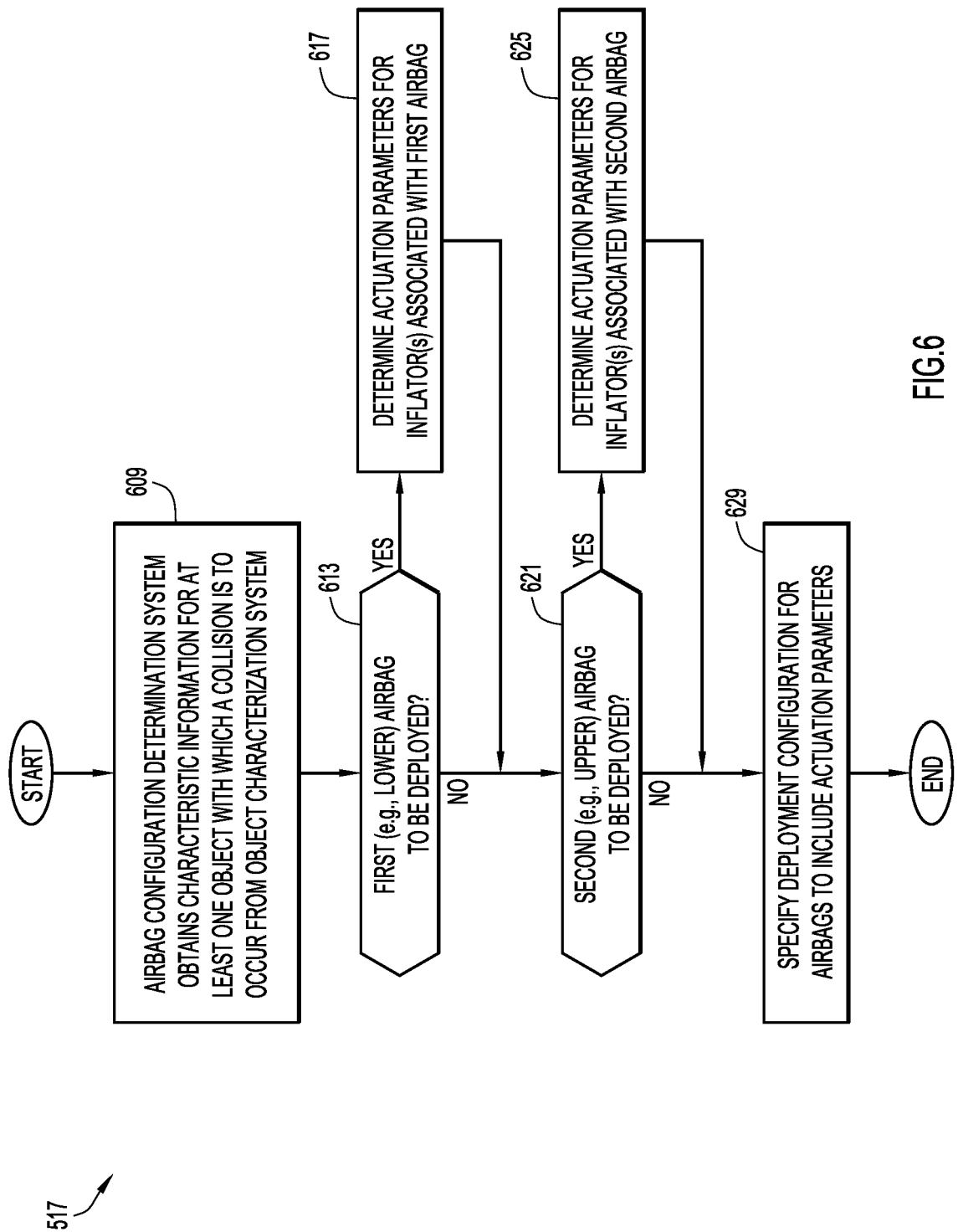
FIG. 6 is a flow chart illustrating an example method for determining a suitable deployment configuration for deploying one or more airbags, according to an example embodiment.

With reference to FIG. 6, FIG. 6 is a flow chart illustrating an example method 517 for determining a suitable deployment configuration for deploying one or more airbag(s), e.g., step 517 of FIG. 5, will be described in accordance with an embodiment. In the described embodiment, for ease of discussion, a vehicle includes two airbags arranged to be deployed with respect to an exterior of the vehicle. It should be appreciated, however, that the number of airbags included in a vehicle may vary widely. A method 517 of determining a suitable deployment configuration for deploying one or more airbag(s) begins at a step 609 in which an airbag configuration determination system, e.g., airbag configuration determination system 458 of FIG. 4, obtains characteristics/characteristic information for at least one object with which a collision is to occur from an object characterization system, e.g., object characterization system 456 of FIG. 4. The characteristic information of the at least one object may generally indicate any suitable characteristics of the at least one object including, but not limited to including, one or more dimensions of the at least one object (e.g., height, width) and, in some instances, an object type (e.g., human or non-human).

Based on the characteristic information obtained in step 609 and other information such as a vehicle speed and/or an estimated time before a collision impact, a determination is made in step 613 as to whether a first external airbag of the vehicle is to be deployed. In one embodiment, the first airbag may be positioned at a lower front portion of the vehicle. If it is determined that the first airbag is to be deployed, the implication is that when deployed, the first airbag would be likely to substantially cushion the object without causing damage to the object in the event of a collision between the vehicle and the object. As such, in a step 617, actuation parameters for the inflator or inflators used to deploy the first airbag, are determined. Such actuation parameters may include, but are not limited to including, a time at which each inflator is to be triggered and/or a force or pressure that is to be provided by each inflator when activated.

In one embodiment, an airbag may have a substantially nominal, e.g., ideal, pressure, and an inflator may be triggered with a timing that enables the substantially nominal pressure to effectively be reached at a moment of impact between a vehicle and an object. In another embodiment, the desired pressure within an airbag may differ depending upon a size and a location of an object, and an inflator may be triggered with a timing that enables the substantially desired pressure within an airbag to be reached at a moment of impact between a vehicle and an object.

Several timing considerations may be involved when determining to deploy an airbag including, time to position, time to pressure, and stand-up time. The time to position may include the time to deploy an airbag, which may include the time involved to open a chamber holding the airbag, the time involved for the airbag to unfold, and/or the like. The time to pressure may include the time involved to inflate the airbag to one or more desired pressures. The stand-up time is the total time that an airbag remains inflated to a useful or desired pressure. Stated differently, once inflated to a useful/desired pressure, the stand-up time may represent the time that it may take for the pressure to decrease below a threshold (e.g., due to air leaking from the airbag). Generally, the different times may be represented as: time to position<time to pressure<stand-up time. In some instances, an airbag may be inflated to a first air pressure pre-collision with an object and may be further inflated to one or more second air pressures post-collision with the object, which may help to avoid strike through of the object with the body of the autonomous vehicle. In some instances, the time to position may overlap with the time to pressure (e.g., an airbag can begin to be inflated as it is being deployed into a given position). In still some further instances, timing considerations may include time to position and time to pressure based on the type of airbag that is to be deployed, e.g., vented or non-vented/sealed. In still some instances, different pressures may be determined based on dimensions of the object (e.g., higher pressures for larger objects, etc.).

In general, timing considerations, depending on type of airbag and desired pressure(s), can range from tens of milliseconds to hundreds of milliseconds (or more). Thus, given the speed of the vehicle, the estimated time of collision with the object, the type of airbag(s) to be deployed, and one or more desired pressure(s) for the airbag(s), different actuation parameters may be determined for different ones of airbags 466a and/or 466b, including, but not limited to, a time or times at to begin inflation of one or more airbag(s) 466a, 466b (e.g., an initial time at which to begin inflation to a first pressure and a second time at which to continue inflation, say, post-collision, to begin inflation to a second pressure), a rate of inflation of one or more airbag(s) 466a, 466b, one or more desired pressure(s) of one or more airbag(s) 466a, 466b, and/or the like.

From step 617, method moves to a step 621 in which it is determined whether a second external airbag of a vehicle is to be deployed. In one embodiment, the second airbag may be positioned at an upper front portion of the vehicle. If it is determined that the second airbag is to be deployed, actuation parameters for the inflator or inflators associated with the second airbag are determined in a step 625. After the actuation parameters for each inflator associated with the second airbag are determined, in a step 629, the deployment configuration for the external airbags on the vehicle is specified to include the actuation parameters. In one instance, specifying the deployment configuration may include generating the deployment configuration including any determined actuation parameters via a format, etc. that can be consumed or otherwise executed by the control system 336 for Upon specifying the deployment configuration for the airbags such that the actuation parameters are included, the method of determining a suitable configuration of airbag deployment is completed.

Returning to step 613 and the determination of whether to deploy the first airbag, if it is determined that the first airbag is not to be deployed, then the indication is that deploying the first airbag is either relatively inconsequential with respect to the object or would likely cause harm to the object. Accordingly, the method moves from step 613 to step 621 in which it is determined whether the second airbag is to be deployed.

Returning to step 621 and the determination of whether to deploy the second airbag, if it is determined that the second airbag is not to be deployed, then the indication is that deploying the second airbag is either not necessary to protect the object or would potentially have an adverse effect on the object. As such, the method moves from step 621 to step 629 in which the deployment configuration of the airbags is specified. Although not illustrated in FIG. 6, it is to be understood that if neither the first airbag nor the second airbag are to be deployed, no actuation parameters may be specified for the deployment configuration.

In some instances, the determinations at 613 and 621 may be performed in relation to one or more dimensions of an object (e.g., height satisfying one or more threshold(s), etc.), as discussed in further detail with reference to FIG. 7, below. For example, in some instances, a determination may be made that no airbags are to be deployed if the object with which is collision is to occur does not satisfy a minimum height threshold or threshold range (e.g., is at or below), such as for collisions that may occur with general road debris.

Figure 7:
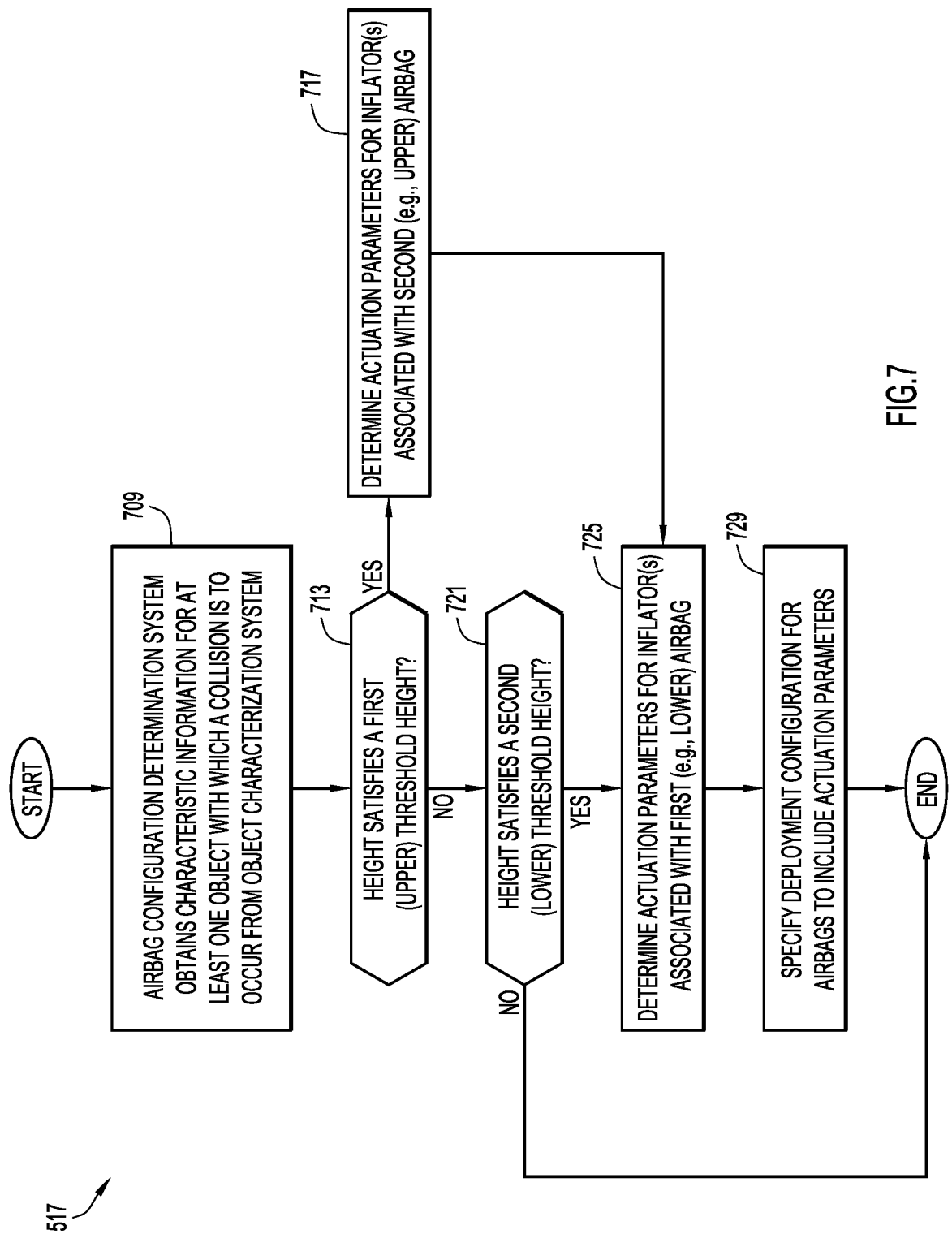
FIG. 7 is a flow chart illustrating another example method for determining a suitable deployment configuration for deploying one or more airbags, according to an example embodiment

FIG. 7 is a flow chart illustrating another example method for determining a suitable configuration for airbag deployment based on an overall height of an object, e.g., another potential embodiment of step 517 of FIG. 5, in accordance with an embodiment. For example, in one embodiment, method 517 for determining a suitable configuration for airbag deployment may begin at a step 709 in which an airbag configuration determination system of the vehicle obtains characteristic information for an object with which a collision is to occur, including a height of the object, from an object characterization system of the vehicle (e.g., object characterization system 456 of FIG. 4).

A determination is made in a step 713 as to whether the height of the object satisfies a first (e.g., an upper) threshold height. The threshold height may be any suitable height, and may vary widely. In one embodiment, the threshold height may be selected to be a height above which both a first airbag (e.g., a lower airbag) and a second airbag (e.g., an upper airbag) are to be deployed, and below which an additional determination is to be made as to whether the height of the object is above a second (lower threshold), such as, for example, to determine whether the first (e.g., a lower) airbag is or is not to be deployed. Consider, for example, that it may be desirable not to deploy either airbag for certain small objects (e.g., below a minimum threshold height), such as general road debris (e.g., limbs, small boxes, litter etc.) with which a collision is to occur.

In one example, if a determination is made at 713 that the height satisfies (e.g., is equal to or greater than) the first threshold height (YES at 713), the indication is that both the first airbag and the second airbag are to be deployed. As such, the method moves from step 713 to a step 717 in which actuation parameters for at least one inflator associated with the second (e.g., upper) airbag are determined. Once the actuation parameters for the inflator or inflators for the second airbag are determined, the actuation parameters for inflators associated with the first (e.g., lower) airbag are determined in step 725.

Returning to step 713, if a determination is made that the height of the object does not satisfy the first threshold height (NO at 713), then in a step 721, an additional determination is made as to whether the height of the object satisfies a second threshold height (e.g., a lower/minimum threshold height). If a determination is made at 721 that the height of the object does satisfy the second threshold height (YES at 721), the method moves from 721 to 725 in which actuation parameters for at least one inflator associated with the first airbag are determined in step 725.

From step 725, the method proceeds to a step 729 in which the deployment configuration for the airbags, or the deployment plan for the airbags, is specified. Once the configuration for the airbags is specified, the method of determining a suitable configuration for airbag deployment is completed.

Returning to step 721, if a determination is made that the height of the object does not satisfy the second (e.g., lower) threshold (NO at 721), the method may end, as it is determined that neither the first nor the second airbags are to be deployed for the autonomous vehicle.

In one example, the first (e.g., upper) threshold height may be selected to be approximately five feet such that both a first airbag and a second airbag may deploy when the height of the object is above five feet tall. In one example, a second (e.g., lower) threshold height may be selected to be approximately 3 feet such that the only the first airbag may deploy when the object with which the collision is to occur is between 3 feet and 5 feet or that neither the first nor the second airbag are to be deployed with the height of the object is below 3 feet.

Other heights or height ranges can be envisioned. For example, although the embodiment of FIG. 7 is discussed with reference to two height ranges, in some instances, additional height ranges can be envisioned. Consider, in one example, that multiple lower, front-facing airbags may be positioned for the autonomous vehicle 101, such as a mid-range airbag positioned about a middle portion of the front face of the autonomous vehicle 101 and a low-range airbag positioned about a lower portion of the front face of the autonomous vehicle. In this example, multiple heights/height ranges could be considered for determining a suitable airbag deployment configuration.

Figure 8:
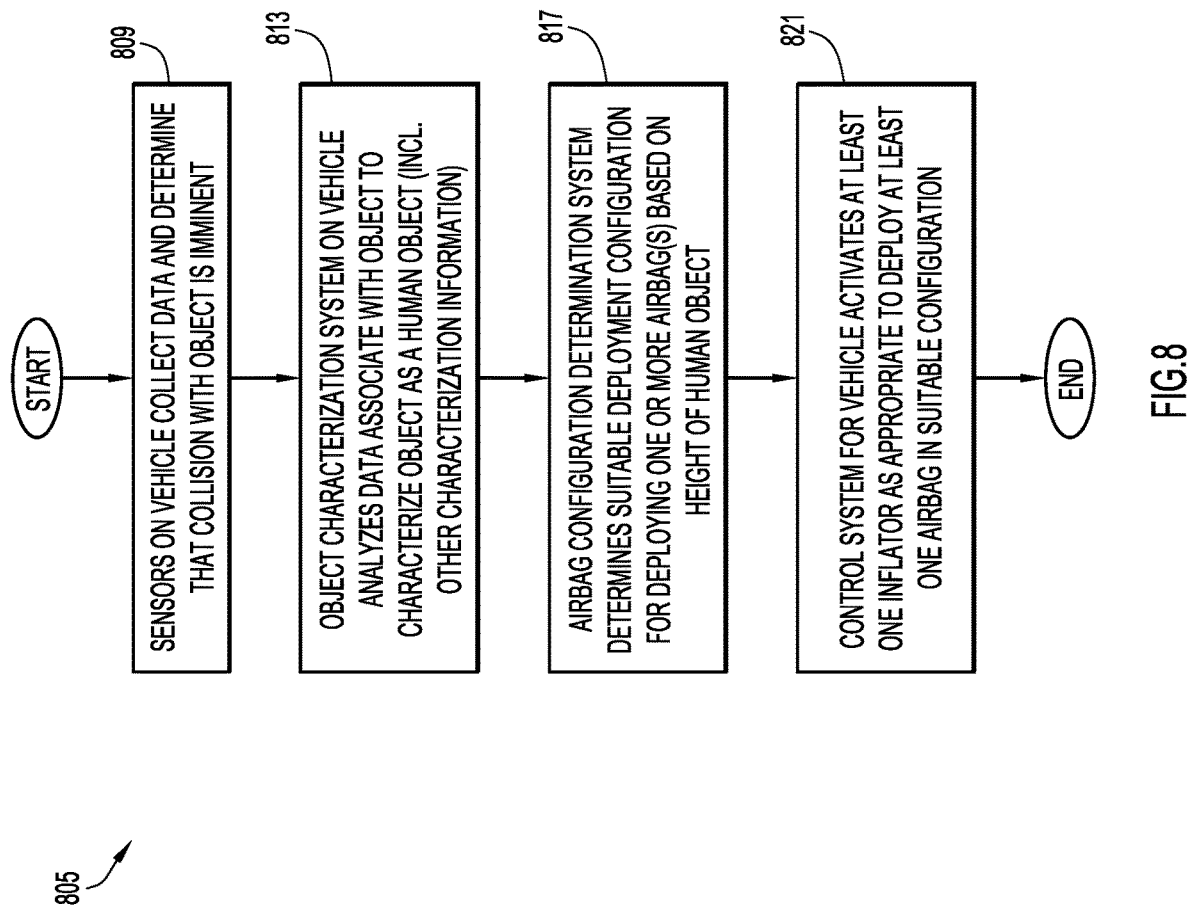
FIG. 8 is a flow chart illustrating an example method for selectively deploying multiple airbags in response to a determination that a collision with a human object is imminent, according to an example embodiment.
Figure 9:
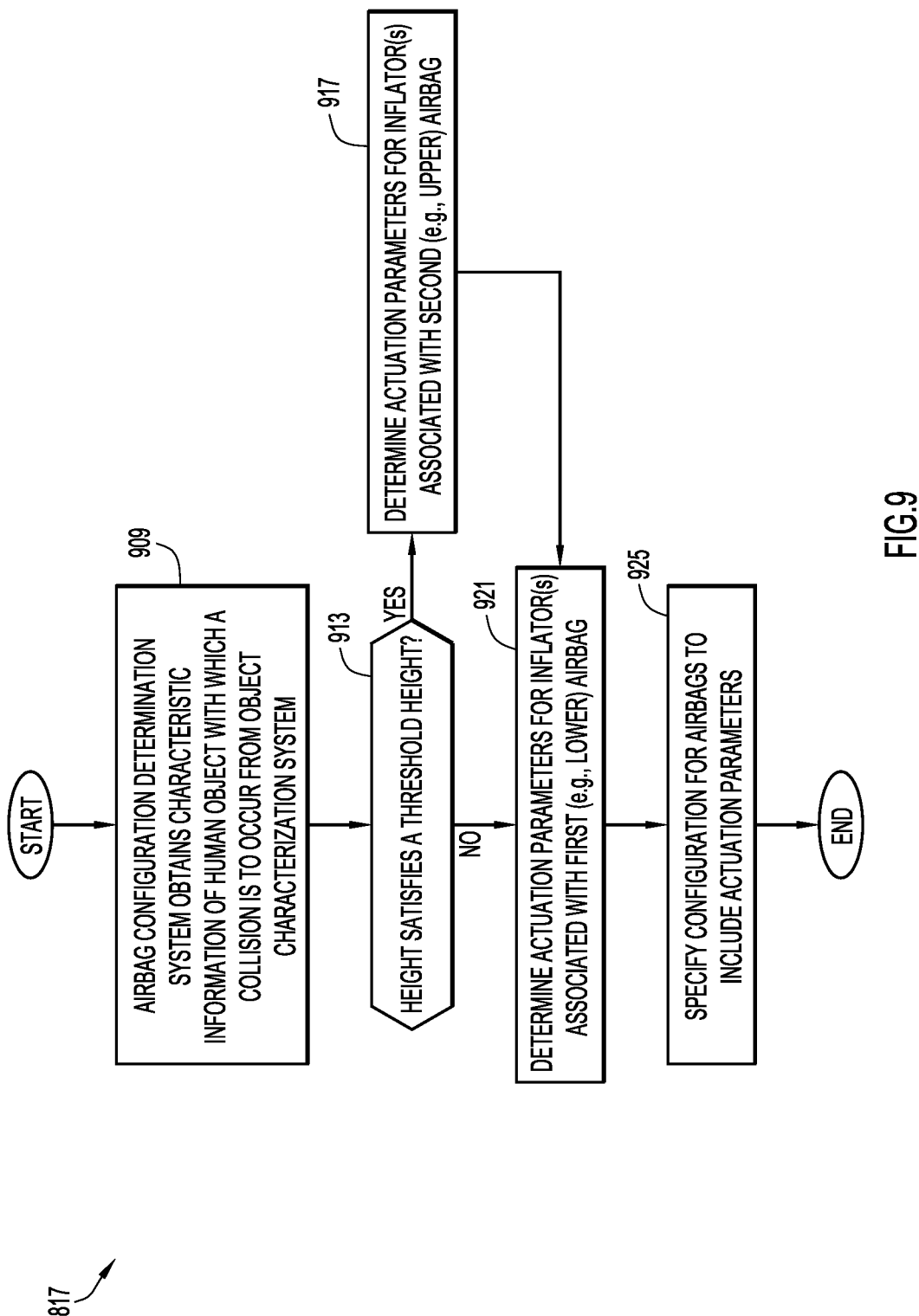
FIG. 9 is a flow chart illustrating a method for determining a suitable configuration for airbag deployment based on a size of a human, according to an example embodiment.

In some embodiments, exterior airbags on a vehicle can be deployed in response to an unavoidable collision with at least one human object, such as pedestrian, cyclist, etc. With reference to FIGS. 8 and 9, the deployment of at least one airbag in response to an imminent collision with a human object will be described in further detail. FIG. 8 is a flow chart illustrating an example method 805 for selectively deploying multiple airbags in response to a determination that a collision with a human object is imminent, according to an example embodiment. Method 805 begins at a step 809 in which sensors on a vehicle (e.g., sensor system 324 of autonomous vehicle 101), collect data and a determination is made (e.g., via collision analysis/prediction system 454) that a collision with an object is imminent or otherwise unavoidable.

In a step 813, an object characterization system (e.g., object characterization system 456) on the vehicle analyzes data associated with the object to characterize the object as a human object. Characterizing the human object may include, but not be limited to, identifying the type of the object as a human object versus a non-human object, identifying an overall height of the human object, and, in some instances, determining relative locations of the various parts of the body of the human object based on the overall height (e.g., identifying geometric features of the human, as discussed above for FIG. 4). For example, given a standing height of the human object or a height of the human object being carried by a transportation device such as a bicycle, motorcycle, etc., estimates may be made as to how high off the ground the neck of the human may be, how high off the ground the abdomen of the pedestrian may be, how high off the ground the thorax of the pedestrian may be, etc.

After the human object is characterized, an airbag configuration determination system of the vehicle (e.g., airbag configuration determination system 458) determines, at 817, a suitable deployment configuration for deploying one or more airbags of the vehicle (e.g., airbag(s) 466a and/or 466b) based at least on the overall height of the human object. One method of determining a suitable configuration for airbag deployment will be discussed below with reference to FIG. 9. Once a suitable deployment configuration for airbag deployment is determined, a control system for the vehicle (e.g., control system 336 via inflator system 460) activates, at 821, at least one inflator, as appropriate, to deploy at least one airbag based on the deployment configuration, and the method of deploying airbags when a collision with a human object is imminent is completed.

FIG. 9 is a flow chart illustrating an example method 817 for determining a suitable configuration for airbag deployment based on an overall height of a human object, according to an example embodiment, e.g., step 817 of FIG. 8. Method 817 for determining a suitable deployment configuration for deploying one or more airbag(s) may begin at a step 909 in which an airbag configuration determination system of the vehicle obtains characteristic information of a human object with which a collision is to occur, including a height of the human object, from an object characterization system of the vehicle (e.g., object characterization system 456).

A determination is made in a step 913 as to whether the height of the human object satisfies a threshold height (e.g., is greater than or equal to). The threshold height may be any suitable height, and may vary widely. In one embodiment, the threshold height may be selected to be a height above which both a first airbag and second airbag are to be deployed, and below which the first airbag is to be deployed but the second airbag is not to be deployed. For example, in one embodiment, a threshold height may be selected to be approximately five feet such that when a human object with whom a collision is imminent is at least five feet tall, both a first airbag and a second airbag may deploy whereas when the human object with whom the collision is imminent is less than five feet tall, only the first airbag may deploy.

If the determination in step 913 is that the height of the human object does not satisfy the threshold height (NO at 913), then in a step 921, actuation parameters for at least one inflator associated with the first (e.g., lower) airbag are determined. From step 921, the method proceeds to a step 925 in which the deployment configuration for the airbags is specified. Once the deployment configuration for the airbags is specified, the method of determining a suitable configuration for airbag deployment is completed.

Returning to step 913 and the determination of whether the height satisfies the threshold height, if the determination is that the height satisfies the threshold height (YES at 913), the indication is that both the first (e.g., lower) airbag and the second (e.g., upper) airbag are to be deployed. As such, the method moves from step 913 to a step 917 in which actuation parameters for at least one inflator associated with the second (e.g., upper) airbag are determined. Once the actuation parameters for the inflator or inflators for the second airbag are determined, the actuation parameters for inflators associated with the first airbag are determined in step 921.

Figure 10:
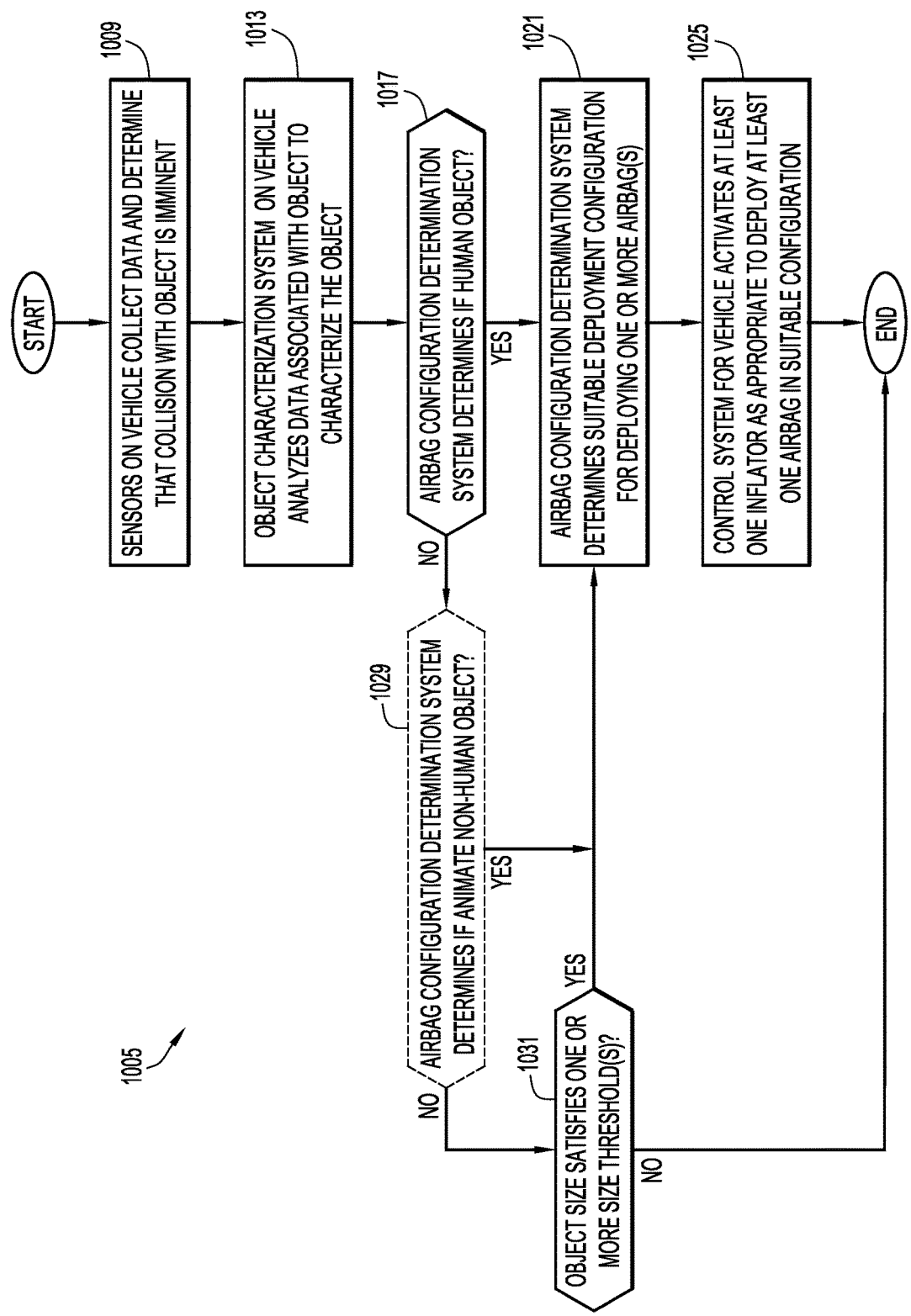
FIG. 10 is a flow chart illustrating a method for determining a suitable configuration for airbag deployment based on a type of an object with which a collision is imminent, according to an example embodiment.

In some embodiments, an autonomous vehicle (e.g., autonomous vehicle 101) may determine a suitable configuration for deploying one or more airbags based on determining the type of object with which a collision is to occur. FIG. 10 is a flow chart illustrating an example method 1005 for selectively deploying multiple airbags based on a determination of the type of object with which a collision is to occur, according to an example embodiment. Method 905 begins at a step 1009 in which sensors on a vehicle (e.g., sensor system 324 of autonomous vehicle 101), collect data and a determination is made (e.g., via collision analysis/prediction system 454) that a collision with an object is imminent or otherwise unavoidable.

In a step 1013, an object characterization system (e.g., object characterization system 456) on the vehicle analyzes data associated with the object to characterize the object as a human object or a non-human object. For example, characterizing the object may include, but not be limited to, identifying the type of the object as a human object or a non-human object, identifying an overall size of the object (e.g., overall height, overall width, overall area/perimeter/ etc. based on a combination of dimensions, etc.). For instances in which the object is characterized as a human object, the characterizing can also include, determining relative locations of the various parts of the body of the human object based on the overall height (e.g., identifying geometric features of the human, as discussed above for FIG. 4).

After the human object is characterized, an airbag configuration determination system of the vehicle (e.g., airbag configuration determination system 458) determines, at 1017 whether the object is a human object or a non-human object based on the object type characterization determined at 1013. Based on a determination that the object is a human object (YES at 1017), the method proceeds to 1021 at which the airbag configuration determination system determines a suitable deployment configuration for deploying one or more airbag(s) of the vehicle. In one embodiment, the determination at 1021 may be performed as discussed above for FIG. 9 involving steps 913, optionally 917, 921, and 925. The method then further proceeds to 1025 and a control system for the vehicle (e.g., control system 336 via inflator system 460) activates at least one inflator, as appropriate, to deploy at least one airbag based on the deployment configuration, and the method is completed.

Returning to 1017, if the airbag configuration determination system determines that the object is not a human object (NO at 1017), the method proceeds to 1031 at which the airbag configuration determination system determines whether the non-human (potentially inanimate) object satisfies one or more size threshold(s). For example, the method may include performing steps 713 and optionally 721 of FIG. 7 based on comparisons to upper and lower height thresholds to determine whether the non-human object satisfies (e.g., meets or breaches) either the upper and lower thresholds, just the lower threshold, or neither threshold. In another instance, an estimates area or perimeter of the non-human object may be compared against one or more threshold(s) to determine whether the non-human object satisfies the one or more threshold(s). Other threshold determinations can be envisioned for step 1029 in accordance with embodiments of the present disclosure.

Based on a determination at 1031 that the non-human object satisfies the one or more size threshold(s), the method proceeds to 1021 at which the airbag configuration determination system determines a suitable deployment configuration for deploying one or more airbag(s) of the vehicle. In one embodiment, the determination at 1021 may be performed based on height of the non-human object as discussed above for FIG. 7 involving step 725 and optionally 729 (if the height satisfies an upper threshold, e.g., is greater than or equal to). The method then further proceeds to 1025 and a control system for the vehicle (e.g., control system 338 via inflator system 460) activates at least one inflator, as appropriate, to deploy at least one airbag based on the deployment configuration, and the method is completed.

However, based on a determination at step 1031 that the non-human object does not satisfy the one or more size threshold(s) (NO at 1029), the method is completed in a manner such that no airbags are deployed for the vehicle.

Returning to 1017 if the airbag configuration determination system determines that the object is not a human object (NO at 1017), in at least one embodiment the method may further determine whether the object is an animate non-human object (e.g., an animal) at 1029. Based on determining at 1029 that the object is an animate non-human object (YES at 1029), the method proceeds to 1021 at which the airbag configuration determination system determines a suitable deployment configuration for deploying one or more airbag(s) of the vehicle and further to 1025 at which the control system for the vehicle (e.g., control system 338 via inflator system 460) activates at least one inflator, as appropriate, to deploy at least one airbag based on the deployment configuration, as discussed above.

Based on determining at 1029 that the object is not an animate non-human object (e.g., it is an inanimate non-human object), the method proceeds to 1031 to determine whether the object satisfies the one or more size threshold(s), and continues therefrom, as discussed above.

Thus, broadly, a method for deploying one more airbags may include detecting, by an autonomous vehicle, an object with which a collision is to occur and determining whether the object is a human object or a non-human object and, in some embodiments, further whether a non-human object is an animate or inanimate non-human object (e.g., based on object characterization information). The method may further include, based on determining that the object is a human object or, in some embodiments, an animate non-human object, determining a deployment configuration for one or more external airbags of the autonomous vehicle and deploying the one or more external airbags for the autonomous vehicle based on the deployment configuration. The deploying may include activating at least one inflator, as appropriate, to deploy at least one airbag based on the deployment configuration.

In one instance, the method may include, based on determining that the object is a non-human object, determining a size of the non-human object. Based on the size of the non-human object satisfying one or more size threshold, the method may include determining a deployment configuration for one or more external airbags of the autonomous vehicle and deploying the one or more external airbags for the autonomous vehicle based on the deployment configuration. The one or more external airbags can be deployed in advance of the collision (e.g., based on an estimated time of collision with the object, speed of the autonomous vehicle, etc.)

In general, airbags intended to be deployed externally with respect to a vehicle may be located substantially anywhere on the vehicle, i.e., disposed substantially anywhere on vehicle. Airbags may be integrated onto a vehicle exterior at effectively any position. In one embodiment, multiple airbags may include one airbag that is arranged, when deployed, to cover at least a portion of a front surface or front face of a vehicle, and another airbag that is arranged, when deployed, to cover a top portion of the front surface or front face of the vehicle. That is, a configuration of deployed airbags may effectively cover leading or forward facing edges of a vehicle. In some instances, airbags may also be arranged about sides of the vehicle, for example, to protect objects from glancing or side/non-direct kinematics.

Figure 11A:
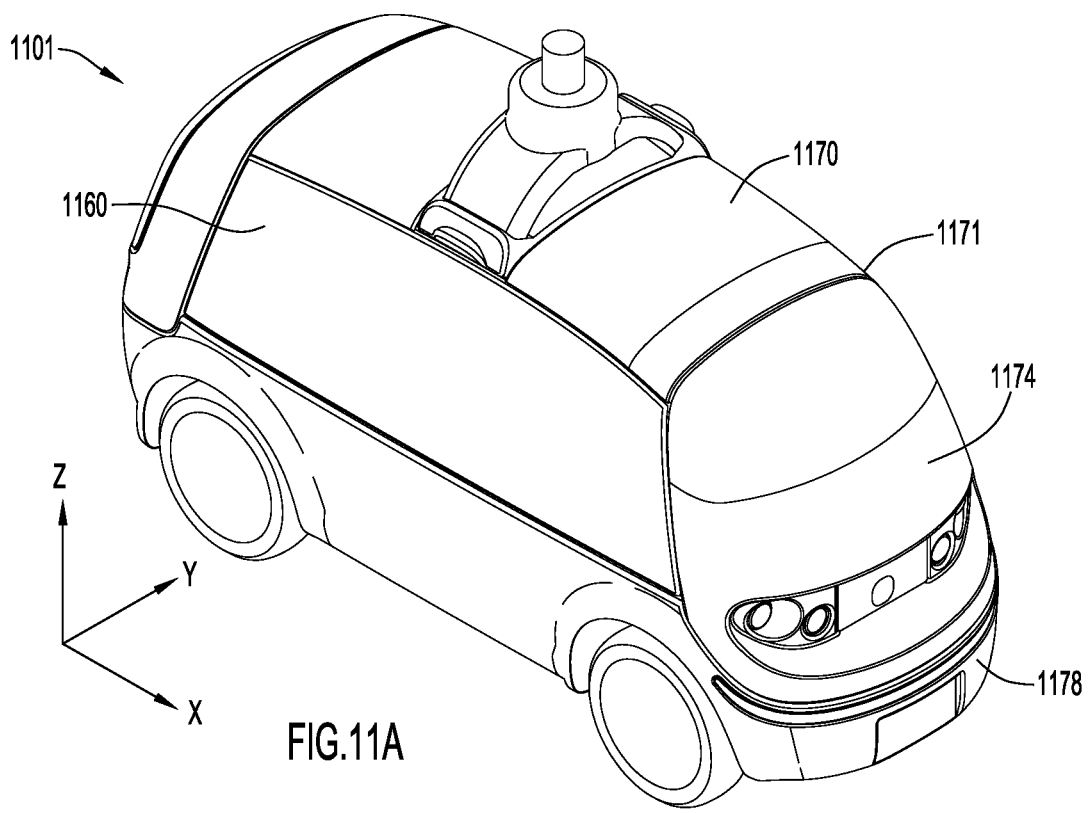
FIGS. 11A and 11B are diagrammatic representations of an autonomous vehicle that depicts locations from which airbags may be deployed, according to an example embodiment.
Figure 11B:
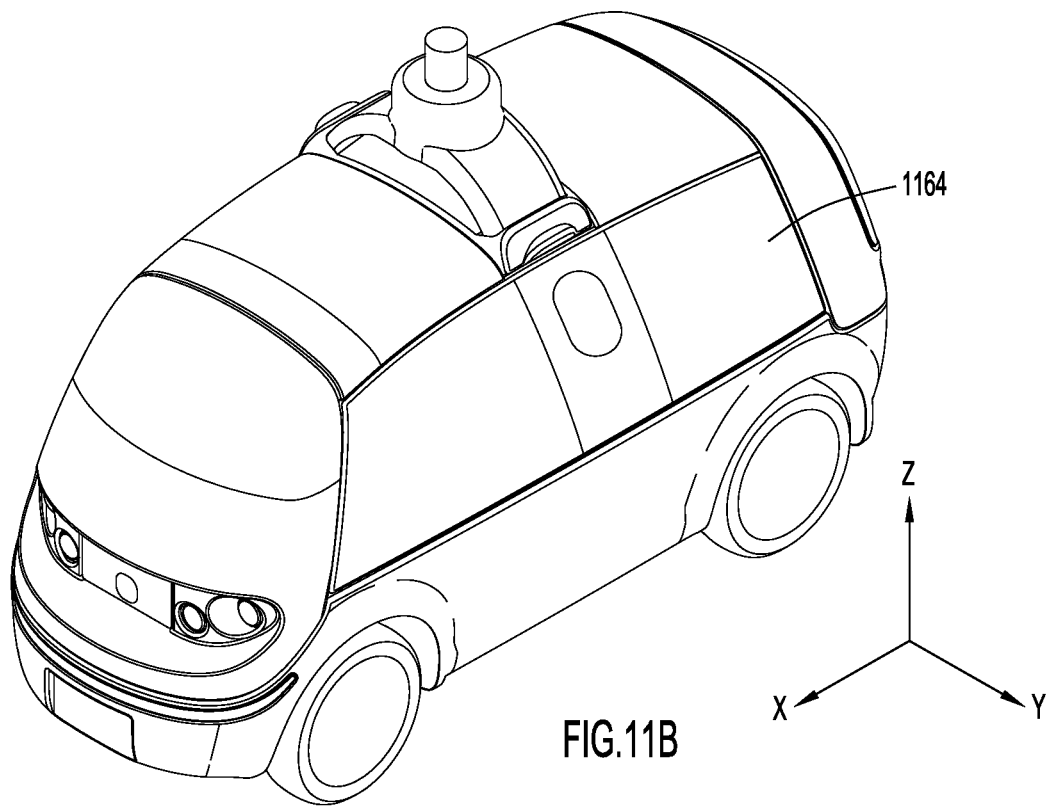

FIGS. 11A and 11B are diagrammatic representations of an autonomous vehicle, which depict locations from which airbags may be deployed, according to an example embodiment. An autonomous vehicle 1101 may include a system (not shown in these figures) that includes a variety of sensors and at least two separate airbags (not shown in these figures) integrated onto an exterior of autonomous vehicle 1101. Vehicle 1101 a first side zone 1160 and a second side zone 1164, relative to a y-axis, and may also include a top zone 1170, a first front zone 1174, and a second front zone 1178, relative to a z-axis.

Top zone 1170 may encompass a top surface of autonomous vehicle 1101, as well as a portion of a front surface of autonomous vehicle 1101 and also a portion of the first side zone 1160 and the second side zone 1164. In one embodiment, top zone 1170 may include a leading edge 1171 of autonomous vehicle 1101 in which edge 1171 may be considered "leading" for a forward direction of travel for the autonomous vehicle 1101, relative to the x-axis. First front zone 1074 includes a middle front surface of autonomous vehicle 1101, relative to the z-axis, in which the top zone 1170 may represent an uppermost portion of the top surface and an uppermost portion of the front surface of the autonomous vehicle 1101. Second front zone 1078 may be a lower front surface of autonomous vehicle 1101, relative to the z-axis. In one embodiment, second front zone may be part of a leading edge and/or a bumper of autonomous vehicle 1101. Although not labeled in FIGS. 11A and 11B, the first side zone 1160 and the second side zone 1164 may also include corresponding middle side surfaces and lower side surfaces.

Airbags (not shown) may be arranged to deploy from any combination of top zone 1170, first front zone 1174, second front zone 1178, first side zone 1160, and/or second side zone 1164 when a collision is imminent or substantially as a collision occurs. Prior to being deployed, the airbags (not shown) may be arranged in a folded state such that the airbags are flat against surfaces of autonomous vehicle 1101.

Figure 12A:
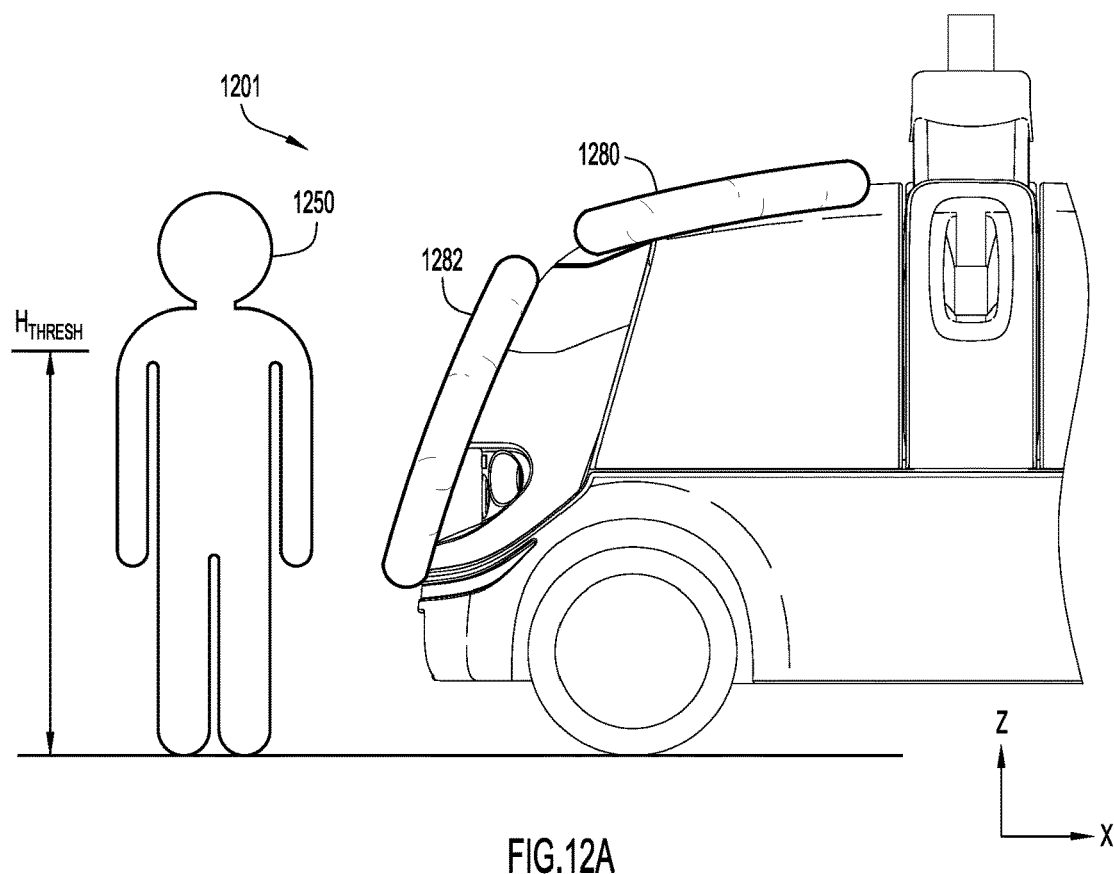
FIGS. 12A and 12B are diagrammatic representations of a portion of an autonomous vehicle that depicts airbags deployed at one or more locations, according to an example embodiment.
Figure 12B:
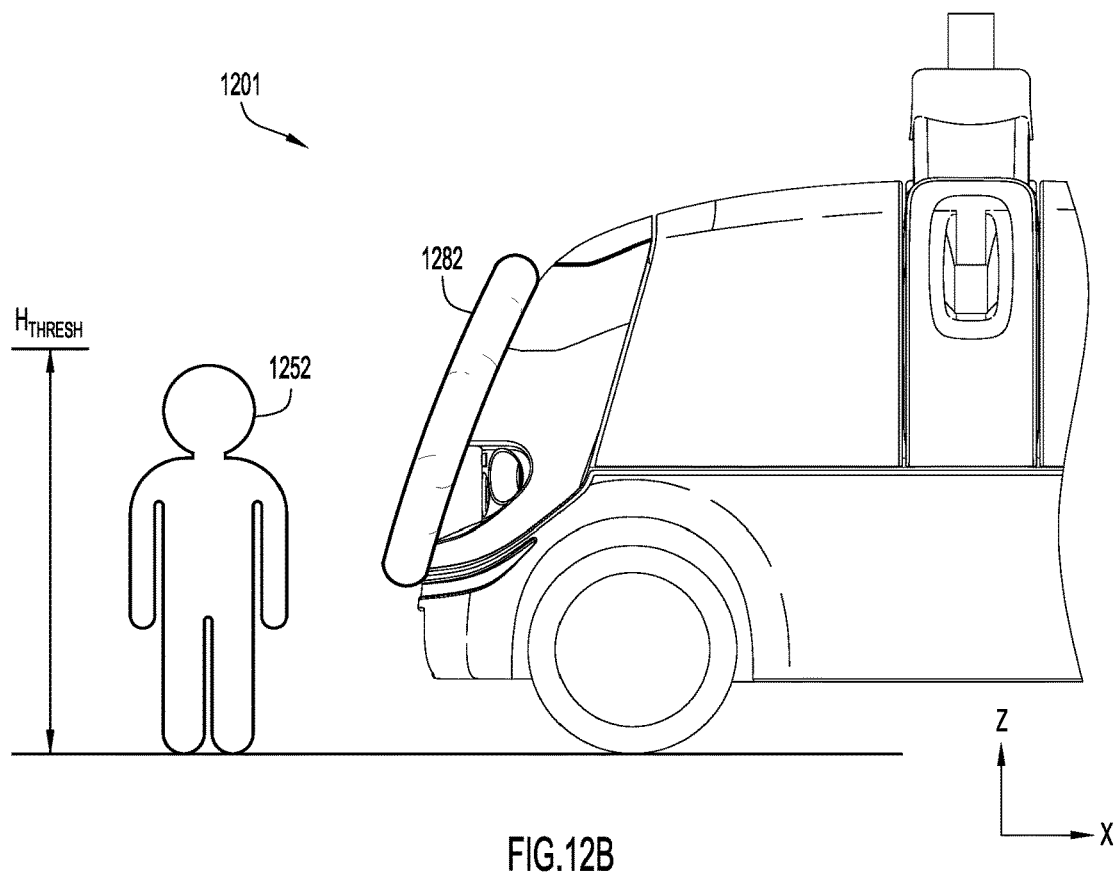

FIGS. 12A and 12B are diagrammatic representations of a portion of an autonomous vehicle, which depict airbags deployed at one or more locations along a top and/or a front surface of an autonomous vehicle, according to an example embodiment. An autonomous vehicle 1201 may be arranged to deploy any combination of airbags 1280, 1282 when a collision between vehicle 1001 and an object, e.g., a pedestrian, is imminent or as a collision is occurring.

For example, as shown in FIG. 12A, an airbag 1280 is deployed along a top surface or zone of autonomous vehicle 1201, and an airbag 1282 is deployed along a front surface or zone of autonomous vehicle 1201. Airbags 1280, 1282 may each be formed to have a single chamber. Alternatively, airbags 1280, 1282 may each be formed to have multiple chambers, e.g., multiple chambers that inflate sequentially from one end to the other. The shapes of airbags 1280, 1282 may vary widely. For example, airbag 1280 may be shaped such that the potential for a rotational brain injury in a human object upon impact with airbag 1280 and autonomous vehicle 1201 may be reduced by substantially altering the kinematics of a collision.

Airbag 1280 is positioned to effectively control the head and neck kinematics of taller human objects to lessen any adverse effects of a collision between autonomous vehicle 1201 and taller human objects. In one embodiment, when a human object 1250 is detected by autonomous vehicle 1201, data relating to the human may be analyzed to determine whether the human object 1250 has a height (along the z-axis shown in FIGS. 12A and 12B) that satisfies (e.g., is greater than or equal to) a threshold height ($H_{THRESH}$) at which airbag 1280 is deployed, as discussed for various embodiments herein. As shown in FIG. 12A, the human object 1250 does have a height that satisfies the threshold height $H_{THRESH}$.

Airbag 1282 covers a substantial portion of a front of autonomous vehicle 1201 and is generally configured to reduce injuries to shorter human objects, or human objects who are of heights that are less than a threshold height, as discussed for various embodiments herein. Airbag 1282 is also configured to control the kinematics associated with the thoraxes and abdomens of taller human objects. Shorter human objects may be protected during and after a collision by airbag 1282, while taller human objects may be protected during and after a collision by both airbag 1282 and airbag 1280.

For example, for human object 1250 shown in FIG. 12A, both airbags 1280 and 1282 are deployed upon determining that the human object 1250 has a height that has a height that satisfies (e.g., meets or exceeds) the height threshold $H_{THRESH}$. In contrast, another human object 1252 is shown in FIG. 12B that has a height that does not satisfy (e.g., is less than) the height threshold $H_{THRESH}$. Thus, for the embodiment of FIG. 12B, only airbag 1282 (e.g., the second, lower airbag) is deployed along a front surface or zone of autonomous vehicle 1201 is deployed.

Figure 13:
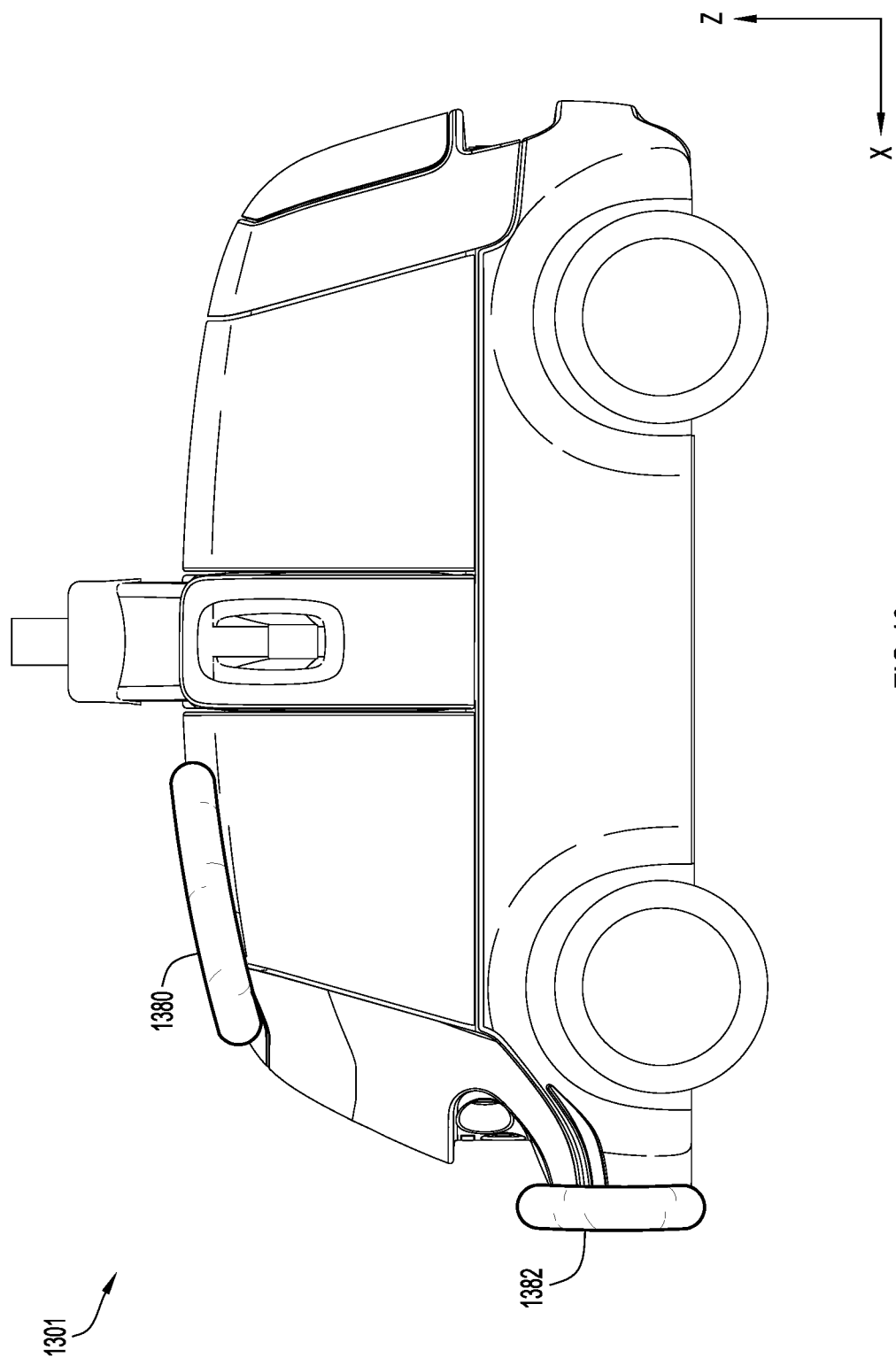
FIG. 13 is a diagrammatic representation of an autonomous vehicle that depicts airbags deployed at two locations, according to another example embodiment.

FIG. 13 is a diagrammatic representation of an autonomous vehicle, which depicts airbags deployed at two locations in accordance with another embodiment. An autonomous vehicle 1301 may be arranged to deploy any combination of airbags 1380, 1382 when a collision between autonomous vehicle 1301 and an object, e.g., a pedestrian, is imminent or as a collision is occurring. As shown, airbag 1380 is deployed along a top surface or zone of autonomous vehicle 1301 and airbag 1382 is deployed along a lower front surface or zone of autonomous vehicle 1301. Airbags 1380, 1382 may be formed as single-chamber airbags or multiple-chamber airbags.

Airbag 1380 is positioned to effectively control the head and neck kinematics of taller human objects to lessen any adverse effects of a collision between autonomous vehicle 1301 and taller pedestrians (i.e., relative to the z-axis shown in FIG. 13). Airbag 1382 covers a lower portion of a front of autonomous vehicle 1301 and is generally configured to reduce injuries to shorter human objects. Airbag 1382 is also configured to essentially cushion the impact of a collision with a taller human object. Shorter pedestrians may be protected during and after a collision by airbag 1382, while taller human objects may be protected during and after a collision by both airbag 1382 and airbag 1380.

Figure 14:
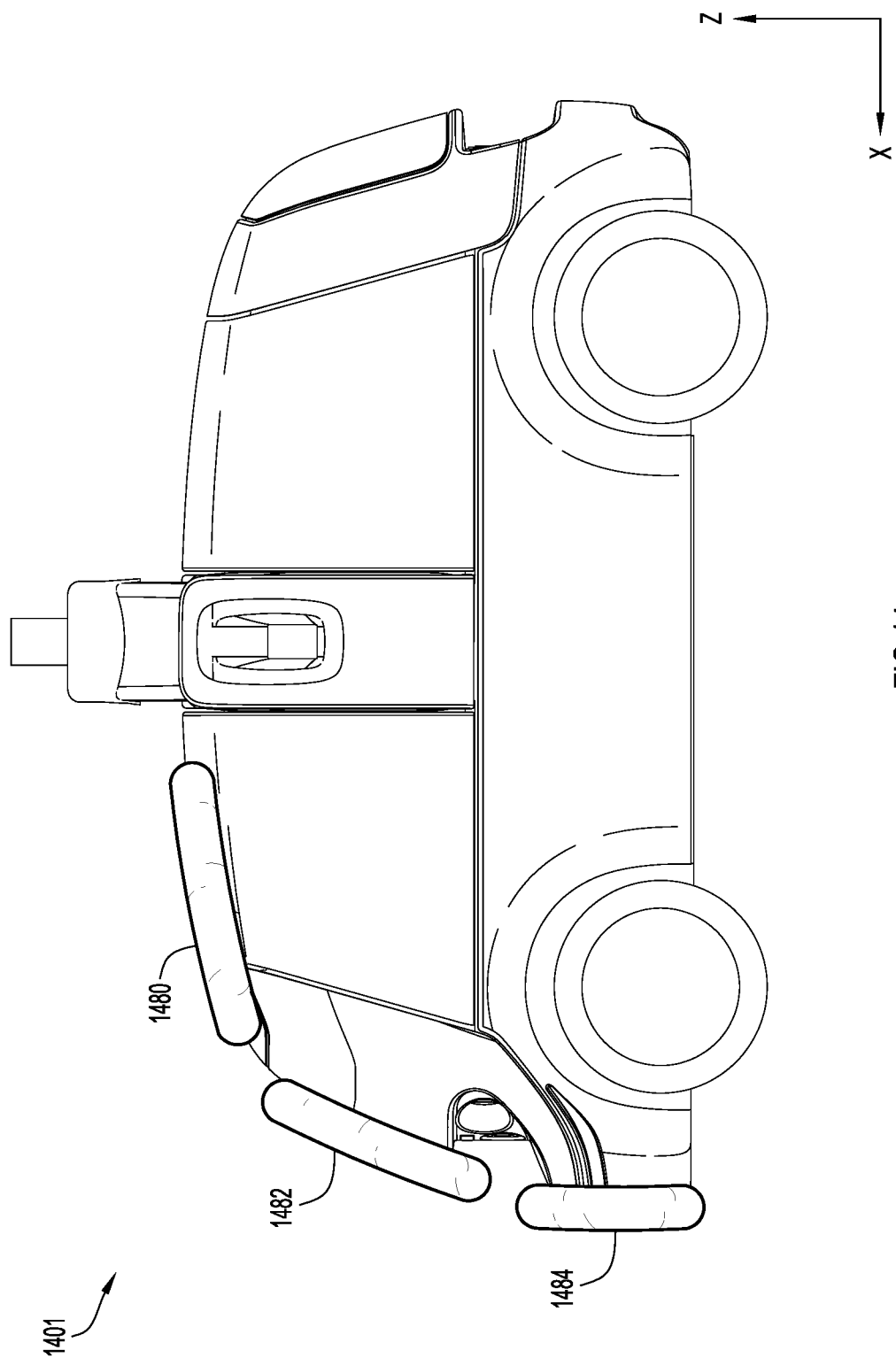
FIG. 14 is a diagrammatic representation of an autonomous vehicle that depicts airbags deployed at three locations, according to another example embodiment.

FIG. 14 is a diagrammatic representation of an autonomous vehicle that depicts airbags deployed at three locations, according to another example embodiment. An autonomous vehicle 1401 may be arranged to deploy any combination of airbags 1480, 1482, and/or 1484 when a collision between autonomous vehicle 1401 and an object, e.g., a pedestrian, is imminent or as a collision is occurring. As shown, airbag 1480 is deployed along a top surface or zone of autonomous vehicle 1401, airbag 1482 is deployed along a middle front surface or zone of autonomous vehicle 1401, and airbag 1484 is deployed along a lower front surface or zone of autonomous vehicle 1401. Airbags 1480, 1482, and 1484 may be formed as single-chamber airbags or multiple-chamber airbags.

Airbag 1480 is positioned to effectively control the head and neck kinematics of taller human objects to lessen any adverse effects of a collision between autonomous vehicle 1401 and taller pedestrians. Airbag 1482 covers a substantial middle portion of a front of autonomous vehicle 1401, and is generally configured to reduce injuries to shorter human objects, or human objects who are of heights (i.e., relative to the z-axis shown in FIG. 14) that are less than a threshold height, as discussed for various embodiments herein. Airbag 1482 is also configured to control the kinematics associated with the thoraxes and abdomens of taller human objects. Airbag 1484 covers a lower portion of a front of autonomous vehicle 1401 and is also generally configured to reduce injuries to shorter human objects. Airbag 1482 is also configured to essentially cushion the impact of a collision with a taller human object. Shorter pedestrians may be protected during and after a collision by airbags 1484 and 1482, while taller human objects may be protected during and after a collision by all airbags 1482, 1484, and 1480.

Figure 15A:
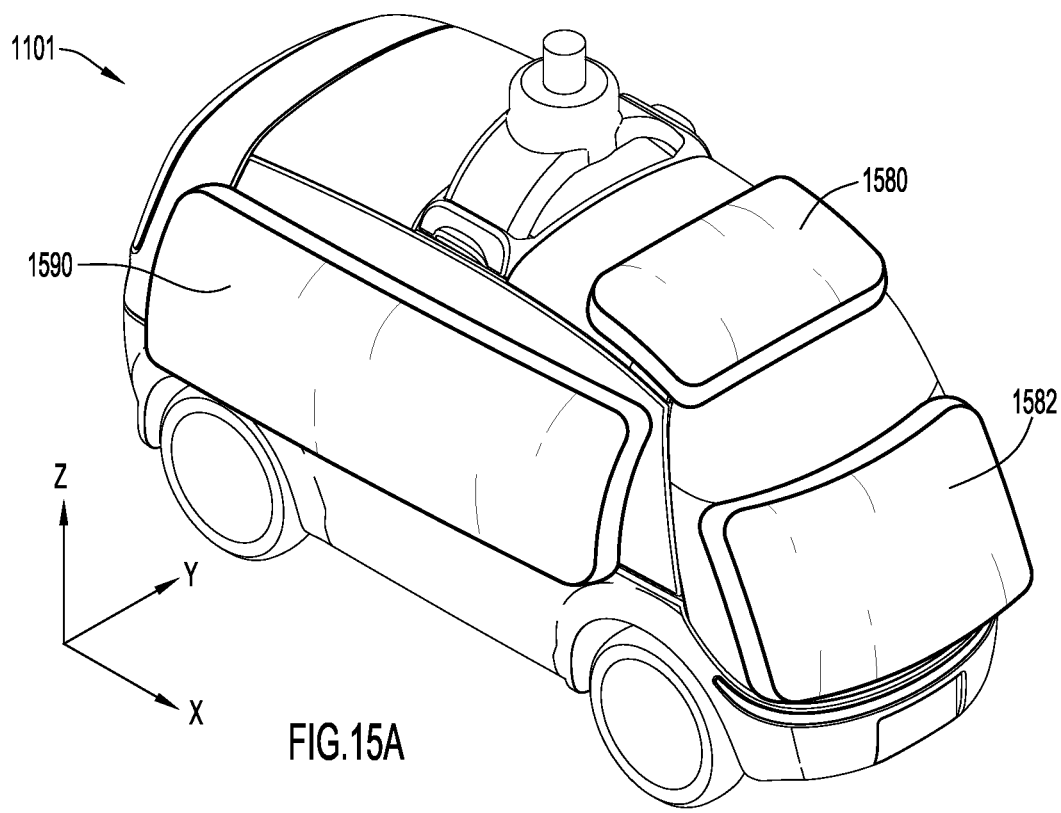
FIGS. 15A and 15B are diagrammatic representations of an autonomous vehicle that depicts airbags deployed at multiple front and side locations, according to an example embodiment.
Figure 15B:
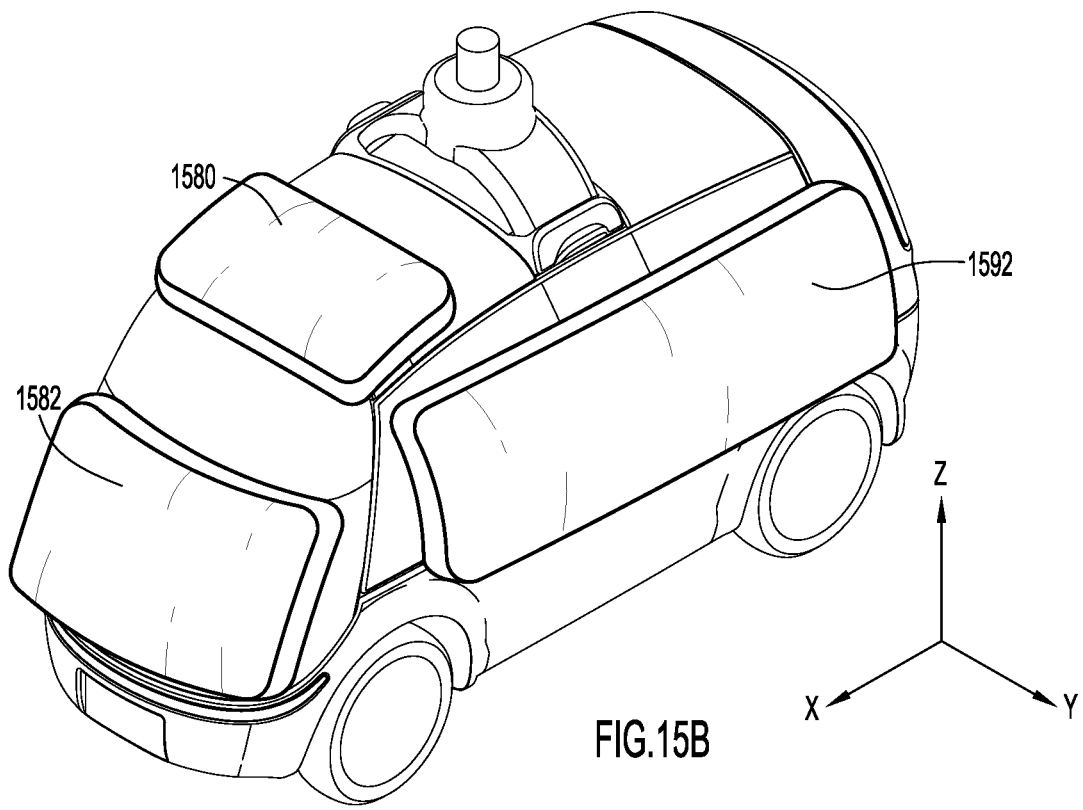

FIGS. 15A and 15B are diagrammatic representations of an autonomous vehicle that depicts airbags deployed at multiple front and side locations, according to an example embodiment. An autonomous vehicle 1501 may be arranged to deploy any combination of airbags 1580, 1582, 1590, and 1592 when a collision between autonomous vehicle 1501 and an object, e.g., a pedestrian, is imminent or as a collision is occurring. As shown, an airbag 1580 is deployed along a top surface or zone of autonomous vehicle 1501 and an airbag 1582 is deployed along a front surface or zone of autonomous vehicle 1501. Generally, airbags 1580 and 1582 may be considered forward-facing airbags. Also shown in FIGS. 15A and 15B, a first side airbag 1590 is deployed along a first side of autonomous vehicle 1501 and a second side airbag 1592 is deployed along a second side of autonomous vehicle 1502, relative to a y-axis. Generally, airbags 1590 and 1592 may be considered side-facing airbags.

Airbags 1580, 1582, 1590, and 1592 may each be formed to have a single chamber. Alternatively, airbags 1580, 1582, 1590, and 1592 may each be formed to have multiple chambers, e.g., multiple chambers that inflate sequentially from one end to the other. The shapes of airbags 1580, 1582, 1590, and 1592 may vary widely. For example, airbag 1580 may be shaped such that the potential for a rotational brain injury in a human object upon impact with airbag 1580 and autonomous vehicle 1501 may be reduced by substantially altering the kinematics of a collision.

Airbag 1580 is positioned to effectively control the head and neck kinematics of taller human objects to lessen any adverse effects of a collision between autonomous vehicle 1501 and taller human objects. In one embodiment, when a human object is detected by autonomous vehicle 1501, data relating to the human object may be analyzed to determine whether the human object has a height (i.e., relative to the z-axis shown in FIGS. 15A and 15B) that satisfies a threshold height (e.g., meets, exceeds, etc.) at which airbag 1580 is deployed, as discussed for various embodiments herein.

Airbag 1582 covers a substantial portion of a front of autonomous vehicle 1501 and is generally configured to reduce injuries to shorter human objects, or human objects who are of heights that are less than a threshold height, as discussed for various embodiments herein. Airbag 1582 is also configured to control the kinematics associated with the thoraxes and abdomens of taller human objects. As shown, shorter human objects may be protected during and after a collision by airbag 1582, while taller human objects may be protected during and after a collision by both airbag 1582 and airbag 1580.

In some instances, side airbags 1590, 1592 may be selectively deployed if it is determined that collision with a human object may involve collision with a given side of an autonomous vehicle. For example, in some instances, a collision may occur as the autonomous vehicle is attempting an evasive maneuver to avoid a human object and/or during a turn of autonomous vehicle. In another example, a width of an object (e.g., width of a non-human object, width of a human object, an overall width of multiple human objects with which a collision may occur, etc.) may be determined to satisfy one or more width thresholds that may indicate a probability of a side collision. Thus, through analysis of data associated with the imminent collision (e.g., object characterization information, vehicle trajectory, speed, simulations of past data, etc.) a given side-facing airbag, such as one or more of side airbags 1590, 1592 may also be deployed in combination with one or more forward facing airbags 1580, 1582.

It is to be understood that any of the combination of airbags as discussed above for FIGS. 12A, 12B, 13, 14, 15A, and 15B may also help to reduce damage to an autonomous vehicle when a collision occurs with a non-human object and/or to help reduce damage to such a non-human object as well.

Although only a few embodiments have been described in this disclosure, it should be understood that the disclosure may be embodied in many other specific forms without departing from the spirit or the scope of the present disclosure. By way of example, the number of airbags that may be deployed with respect to an exterior of a vehicle may vary widely. That is, a vehicle may carry more than two airbags that are arranged to be deployed with respect to an exterior of the vehicle. Further, airbags may be located substantially anywhere on a vehicle, and are not limited to being located on a front and/or a leading-edge surface of the vehicle. For example, airbags may be located on sides of a vehicle, as discussed above for FIGS. 15A and 15B.

In some embodiments, determining an appropriate airbag configuration involves determining the timing of a collision. Generally, an airbag may be at a substantially ideal operating pressure range for a relatively short period of time. Thus, in some instances, when a collision is predicted to occur too soon for one or more airbags to inflate such that an intended position or ideal operating pressure is reached prior to impact, the one or more airbags may not deploy. Alternatively, in some instances, an airbag may be deployed earlier to allow for the pressure in one or more airbags to drop, e.g., when a vehicle is about to come into contact with a smaller pedestrian.

A vehicle may include a single airbag that is to be deployed prior to a collision with a pedestrian, or approximately as a collision is occurring with a pedestrian. Such a single airbag may be located on a vehicle in a position that is determined to be most likely to impact an object as the vehicle drives. In one embodiment, a single airbag may be deployed at a time that allows a substantially desired pressure to be reached within the airbag just as a collision occurs.

Airbags may be arranged to include multiple chambers that are arranged to be individually inflated. Multi-chambered airbags on a vehicle may be configured such that when the vehicle is about to collide with an object, selected chambers of the airbags may be inflated or otherwise deployed. The one or more chambers to be inflated may essentially be selected based upon a height or other dimension of an object that is subject to a substantially unavoidable collision. In one embodiment, multiple multi-chambered airbags may be implemented without departing from the sprit or the scope of the disclosure. In another embodiment, a single multi-chambered airbag may be implemented such that each chamber may be individually inflated, and such that the configuration of chambers to inflate is determined based upon characteristics of a pedestrian that is subject to a substantially unavoidable collision.

While an inflator that deploys a first airbag may be actuated at substantially the same time as an inflator that deploys a second airbag, e.g., when both airbags are to be deployed in advance of a collision with an object, it should be understood that the inflators are not necessarily actuated at substantially the same time. In other words, inflators may be activated at different times.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

Figure 16:
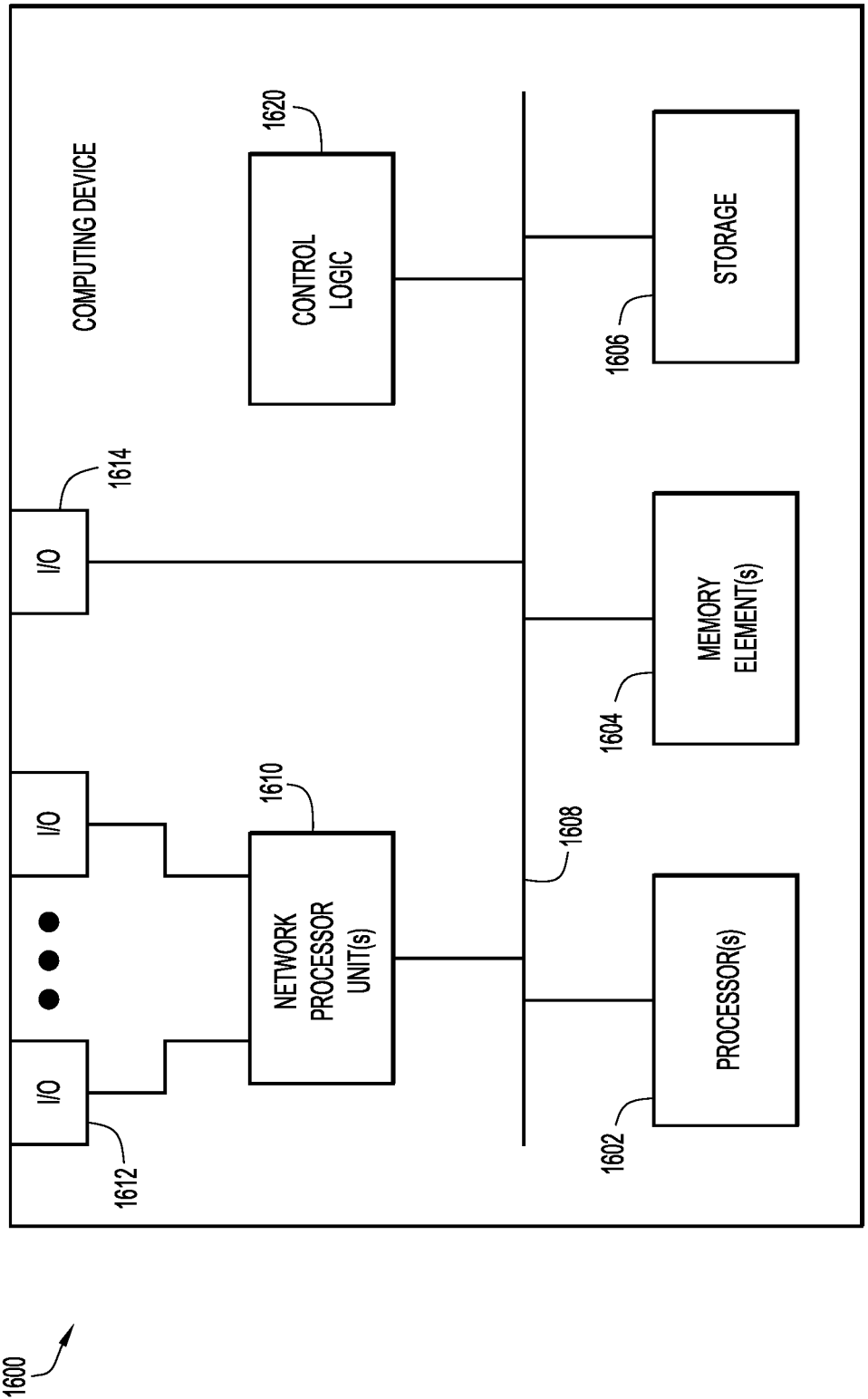
FIG. 16 is a hardware block diagram of a computing device that may perform functions associated with any combination of operations discussed for any techniques depicted herein.

FIG. 16 is a hardware block diagram of a computing device 1600 that may perform functions associated with any combination of operations discussed for any techniques depicted herein. In various example embodiments, a computing device, such as computing device 1600 or any combination of computing devices 1600, may be configured as any entity/entities as discussed for the techniques depicted herein, such as the airbag deployment system 450 or the collision analysis/prediction system 454, in order to perform operations of the various techniques discussed herein.

In at least one embodiment, computing device 1600 may include one or more processor(s) 1602, one or more memory element(s) 1604, storage 1615, a bus 1608, one or more network processor unit(s) 1610 interconnected with one or more network input/output (I/O) interface(s) 1612, one or more I/O interface(s) 1614, and control logic 1620. In various embodiments, instructions associated with logic for computing device 1600 can overlap in any manner and are not limited to the specific allocation of instructions and/or operations described herein.

In at least one embodiment, processor(s) 1602 is/are at least one hardware processor configured to execute various tasks, operations and/or functions for computing device 1600 as described herein according to software and/or instructions configured for computing device. Processor(s) 1602 (e.g., hardware processor(s)) can execute any type of instructions associated with data to achieve the operations detailed herein. In one example, processor(s) 1602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1604 and/or storage 1606 is/are configured to store data, information, software, and/or instructions associated with computing device 1600, and/or logic configured for memory element(s) 1604 and/or storage 1606. For example, any logic described herein (e.g., control logic 1620) can, in various embodiments, be stored for computing device 1600 using any combination of memory element(s) 1604 and/or storage 1606. Note that in some embodiments, storage 1606 can be consolidated with memory element(s) 1604 (or vice versa), or can overlap/exist in any other suitable manner.

In at least one embodiment, bus 1608 can be configured as an interface that enables one or more elements of computing device 1600 to communicate in order to exchange information and/or data. Bus 1608 can be implemented with any architecture designed for passing control, data and/or information between processors, memory elements/storage, peripheral devices, and/or any other hardware and/or software components that may be configured for computing device 1600. In at least one embodiment, bus 1608 may be implemented as a fast kernel-hosted interconnect, potentially using shared memory between processes (e.g., logic), which can enable efficient communication paths between the processes. In at least one embodiment, bus 1608 may be implemented as a Controller Area Network (CAN) bus.

In various embodiments, network processor unit(s) 1610 may enable communication between computing device 1600 and other systems, entities, etc. (e.g., for an autonomous vehicle), via network I/O interface(s) 1612 to facilitate operations discussed for various embodiments described herein. In various embodiments, network processor unit(s) 1610 can be configured as a combination of hardware and/or software, such as one or more Ethernet driver(s) and/or controller(s) or interface cards, CAN driver(s) and/or controllers, optical driver(s) and/or controller(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1612 can be configured as one or more Ethernet port(s), CAN ports, and/or any other I/O port(s) now known or hereafter developed. Thus, the network processor unit(s) 1610 and/or network I/O interfaces 1612 may include suitable interfaces for receiving, transmitting, and/or otherwise communicating data and/or information in a network/vehicular environment.

I/O interface(s) 1614 allow for input and output of data and/or information with other entities that may be connected to computer device 1600. For example, I/O interface(s) 1614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1620 can include instructions that, when executed, cause processor(s) 1602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1604 and/or storage 1606 can store data, software, code, instructions (e.g., processor instructions), logic, parameters, combinations thereof, and/or the like used for operations described herein. This includes memory element(s) 1604 and/or storage 1606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIGS. 3 and 4, may include hardware, firmware, and/or software embodied on a tangible medium. A tangible medium may be substantially any computer-readable medium that is capable of storing logic or computer program code that may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, with respect to FIG. 10, the steps of determining actuation parameters associated with first and second airbags may occur in substantially any order, or simultaneously. Therefore, the present examples are to be considered as illustrative and not restrictive, and the examples are not to be limited to the details given herein, but may be modified within the scope of the appended claims.

In one form, a computer-implemented method is provided that may include detecting, by an autonomous vehicle, an object with which a collision is to occur; determining a deployment configuration for one or more external airbags of the autonomous vehicle based on one or more dimensions of the object; and deploying the one or more external airbags for the autonomous vehicle based on the deployment configuration. In various instances, the one or more dimensions include at least of: a height of the object; and a width of the object.

In one instance, determining the deployment configuration for the one or more external airbags of the autonomous vehicle further comprises: determining, based at least one of the height and the width of the object, the one or more external airbags for the autonomous vehicle that are to be deployed. In one instance, determining the deployment configuration is based additionally on at least one of: a speed of the autonomous vehicle; and an estimated time at which the collision is to occur.

In one instance, wherein determining the deployment configuration for the one or more external airbags of the autonomous vehicle further comprises: determining whether the height of the object satisfies a height threshold; and based on determining that the height of the object does not satisfy the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is not to be deployed.

In one instance, determining the deployment configuration for the one or more external airbags of the autonomous vehicle further comprises: determining whether the height of the object satisfies a height threshold; and based on determining that the height of the object satisfies the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is to be deployed and determining at least one deployment configuration for the at least one second external airbag.

In one instance, determining the deployment configuration for one or more external airbags of the autonomous vehicle further comprises: determining actuation parameters for one or more inflators associated with the one or more external airbags, wherein deploying the one or more external airbags for the autonomous vehicle is performed by activating the one or more inflators to inflate the one or more external airbags based on the deployment configuration. In one instance, if at least two external airbags of the one or more external airbags are deployed, the at least two external airbags can be inflated to different pressures.

In one instance, the one or more external airbags include one or more first external airbag configured for a lower body portion of the autonomous vehicle and one or more second external airbags configured for an upper body portion of the autonomous vehicle. In one instance, the one or more external airbags further include one or more third external airbags configured for at least one of a first side and a second side of the autonomous vehicle.

In one instance, the deploying includes deploying the one or more external airbags for the autonomous vehicle based on the deployment in advance of the collision with the object.

In one form, another computer-implemented method is provided that may include detecting, by an autonomous vehicle, an object with which a collision is to occur; determining whether the object is a human object or a non-human object; based on determining that the object is a human object, determining a deployment configuration for one or more external airbags of the autonomous vehicle; and deploying the one or more external airbags for the autonomous vehicle based on the deployment configuration. In various instances, the human object includes a pedestrian or a cyclist. In some instances, the human object includes an entirety of the human object or a portion of the human object.

In one instance, determining whether the object is a human object or a non-human object further comprises: determining characterization information for the object, wherein the characterization information comprises an object type that indicates whether the object is a human object or a non-human object. In one instance, the method may include based on determining that the object is a human object, the characterization information further comprises at least one of a height and a width of the human object.

In one instance, determining the deployment configuration for the one or more external airbags of the autonomous vehicle further comprises: determining a speed of the autonomous vehicle; determining an estimated time at which the collision is to occur; and determining, based on at least one of a height and a width of the human object, the one or more external airbags for the autonomous vehicle that are to be deployed.

In one instance, determining the deployment configuration for the one or more external airbags of the autonomous vehicle further comprises: determining whether the height of the human object satisfies a height threshold; and based on determining that the height of the human object does not satisfy the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is not to be deployed.

In one instance, determining the deployment configuration for the one or more external airbags of the autonomous vehicle further comprises: determining whether the height of the human object satisfies a height threshold; and based on determining that the height of the human object satisfies the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is to be deployed and determining at least one deployment configuration for the at least one second external airbag.

In one instance, determining the deployment configuration for one or more external airbags of the autonomous vehicle further comprises: determining actuation parameters for one or more inflators associated with the one or more external airbags, wherein deploying the one or more external airbags for the autonomous vehicle is performed by activating the one or more inflators to inflate the one or more external airbags based on the deployment configuration. In at least one instance, if at least two external airbags of the one or more external airbags are deployed, the at least two external airbags are inflated to different pressures.

In one instance, the one or more external airbags include one or more first external airbags configured for a lower body portion of the autonomous vehicle and one or more second external airbags configured for an upper body portion of the autonomous vehicle. In one instance, the one or more external airbags further include one or more third external airbags configured for at least one of a first side and a second side of the autonomous vehicle.

In one instance, based on determining that the object is a non-human object, the method may further include determining a size of the non-human object; based on the size of the non-human object satisfying one or more size threshold, determining the deployment configuration for one or more external airbags of the autonomous vehicle; and deploying the one or more external airbags for the autonomous vehicle based on the deployment configuration.

In one instance, based on determining that the object is a non-human object, the method may further include determining whether the object is an animate object or an inanimate object. In one instance, based on determining that the object is an animate object, the method may further include determining the deployment configuration for one or more external airbags of the autonomous vehicle based on whether the animate object satisfies a height threshold.

In one form, an airbag deployment system for an autonomous vehicle is provided in which the airbag deployment system comprises a plurality of external airbags; at least one memory element for storing data; and at least one processor for executing instructions associated with the data, wherein executing the instructions causes the airbag deployment system to perform operations, comprising: detecting an object with which a collision is to occur; determining a deployment configuration for one or more external airbags of the plurality of airbags based on one or more dimensions of the object; and deploying the one or more external airbags for the autonomous vehicle based on the deployment configuration.

In one instance, the one or more dimensions include a height of the object and determining the deployment configuration for the one or more external airbags of the autonomous vehicle further comprises: determining whether the height of the object satisfies a height threshold; and based on determining that the height of the object does not satisfy the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is not to be deployed.

In one instance, the one or more dimensions include a height of the object and determining the deployment configuration for the one or more external airbags of the autonomous vehicle further comprises: determining whether the height of the object satisfies a height threshold; and based on determining that the height of the object satisfies the height threshold: determining that at least one first external airbag configured for a lower body portion of the autonomous vehicle is to be deployed and determining a first deployment configuration for the at least one first external airbag; and determining that at least one second external airbag configured for an upper body portion of the autonomous vehicle is to be deployed and determining at least one deployment configuration for the at least one second external airbag.

In one instance, the plurality of external airbags include one or more first external airbag configured for a lower body portion of the autonomous vehicle and one or more second external airbags configured for an upper body portion of the autonomous vehicle. In one instance, the one or more external airbags further include one or more third external airbags configured for at least one of a first side and a second side of the autonomous vehicle.

In one form, one or more non-transitory computer readable storage media encoded with instructions that, when executed by a processor, cause the processor to perform operations, comprising detecting an object with which a collision is to occur for an autonomous vehicle; determining a deployment configuration for one or more external airbags of the autonomous vehicle based on one or more dimensions of the object; and deploying the one or more external airbags for the autonomous vehicle based on the deployment configuration. In various instances, the one or more dimensions include at least of: a height of the object; and a width of the object.

In one form, one or more non-transitory computer readable storage media encoded with instructions that, when executed by a processor, cause the processor to perform operations, comprising detecting an object with which a collision is to occur for an autonomous vehicle; determining whether the object is a human object or a non-human object; based on determining that the object is a human object, determining a deployment configuration for one or more external airbags of the autonomous vehicle; and deploying the one or more external airbags for the autonomous vehicle based on the deployment configuration Variations and Implementations To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    detecting, by an autonomous vehicle, an object with which a collision is to occur for a forward direction of travel of the autonomous vehicle;
    determining a deployment configuration for one or more external airbags of a plurality of external airbags of the autonomous vehicle based, at least in part, on whether a height of the object satisfies a height threshold, wherein the plurality of external airbags of the autonomous vehicle include one or more first external airbags configured for a front surface body portion of the autonomous vehicle and one or more second external airbags configured for an uppermost top surface body portion of the autonomous vehicle; and
    selectively deploying the one or more external airbags of the plurality of external airbags for the autonomous vehicle based on the deployment configuration, wherein the one or more second external airbags configured for the uppermost top surface body portion of the autonomous vehicle are selectively deployed based on whether the height of the object satisfies or does not satisfy the height threshold for the collision that is to occur with the object for the forward direction of travel of the autonomous vehicle.

2. The method of claim 1, wherein the deployment configuration is based additionally on a width of the object.

3. The method of claim 2, wherein determining the deployment configuration is based additionally on at least one of:
    a speed of the autonomous vehicle; and
    an estimated time at which the collision is to occur.

4. The method of claim 1, wherein determining the deployment configuration for the one or more external airbags of the plurality of external airbags of the autonomous vehicle further comprises:
    based on determining that the height of the object does not satisfy the height threshold:
        determining that at least one first external airbag of the one or more first external airbags configured for the front surface body portion of the autonomous vehicle is to be deployed and determining a first deployment configuration for the at least one first external airbag; and
        determining that at least one second external airbag of the one or more second external airbags configured for the uppermost top surface body portion of the autonomous vehicle is not to be deployed.

5. The method of claim 1, wherein determining the deployment configuration for the one or more external airbags of the plurality of external airbags of the autonomous vehicle further comprises:
    based on determining that the height of the object satisfies the height threshold:
        determining that at least one first external airbag of the one or more first external airbags configured for the front surface body portion of the autonomous vehicle is to be deployed and determining a first deployment configuration for the at least one first external airbag; and
        determining that at least one second external airbag of the one or more second external airbags configured for the uppermost top surface body portion of the autonomous vehicle is to be deployed and determining at least one deployment configuration for the at least one second external airbag.

6. The method of claim 1, wherein determining the deployment configuration for the one or more external airbags of the plurality of external airbags of the autonomous vehicle further comprises:

determining actuation parameters for one or more inflators associated with the one or more external airbags, wherein deploying the one or more external airbags for the autonomous vehicle is performed by activating the one or more inflators to inflate the one or more external airbags based on the deployment configuration.

7. The method of claim 6, wherein if at least two external airbags of the one or more external airbags are deployed, the at least two external airbags are inflated to different pressures.

8. The method of claim 1, wherein the plurality of external airbags of the autonomous vehicle further include one or more third external airbags configured for at least one of a first side and a second side of the autonomous vehicle.

9. The method of claim 1, wherein the deploying includes deploying the one or more external airbags for the autonomous vehicle based on the deployment configuration in advance of the collision with the object.

10. A method comprising:

detecting, by an autonomous vehicle, an object with which a collision is to occur for a forward direction of travel of the autonomous vehicle;

determining whether the object is a human object or a non-human object;

based on determining that the object is a human object, determining a deployment configuration for one or more external airbags of a plurality of external airbags of the autonomous vehicle based, at least in part, on whether a height of the human object satisfies a height threshold, wherein the plurality of external airbags of the autonomous vehicle include one or more first external airbags configured for a front surface body portion of the autonomous vehicle and one or more second external airbags configured for an uppermost top surface body portion of the autonomous vehicle; and selectively deploying the one or more external airbags of the plurality of external airbags for the autonomous vehicle based on the deployment configuration, wherein the one or more second external airbags configured for the uppermost top surface body portion of the autonomous vehicle are selectively deployed based on whether the height of the object satisfies or does not satisfy the height threshold for the collision that is to occur with the human object for the forward direction of travel of the autonomous vehicle.

11. The method of claim 10, wherein the human object includes a pedestrian or a cyclist.

12. The method of claim 10, wherein the human object includes an entirety of the human object or a portion of the human object.

13. The method of claim 10, wherein determining whether the object is a human object or a non-human object further comprises:

determining characterization information for the object, wherein the characterization information comprises an object type that indicates whether the object is a human object or a non-human object.

14. The method of claim 10, wherein determining the deployment configuration for the one or more external airbags of the autonomous vehicle further comprises:

determining a speed of the autonomous vehicle; and
determining an estimated time at which the collision is to occur.

15. The method of claim 14, wherein determining the deployment configuration for the one or more external airbags of the plurality of external airbags of the autonomous vehicle further comprises:

based on determining that the height of the human object does not satisfy the height threshold:

determining that at least one first external airbag of the one or more first external airbags configured for the front surface body portion of the autonomous vehicle is to be deployed and determining a first deployment configuration for the at least one first external airbag; and determining that at least one second external airbag of the one or more second external airbags configured for the uppermost top surface body portion of the autonomous vehicle is not to be deployed.

16. The method of claim 14, wherein determining the deployment configuration for the one or more external airbags of the plurality of external airbags of the autonomous vehicle further comprises:

based on determining that the height of the human object satisfies the height threshold:

determining that at least one first external airbag of the one or more first external airbags configured for the front surface body portion of the autonomous vehicle is to be deployed and determining a first deployment configuration for the at least one first external airbag; and determining that at least one second external airbag of the one or more second external airbags configured for the uppermost top surface body portion of the autonomous vehicle is to be deployed and determining at least one deployment configuration for the at least one second external airbag.

17. The method of claim 10, wherein determining the deployment configuration for the one or more external airbags of the plurality of external airbags of the autonomous vehicle further comprises:

determining actuation parameters for one or more inflators associated with the one or more external airbags, wherein deploying the one or more external airbags for the autonomous vehicle is performed by activating the one or more inflators to inflate the one or more external airbags based on the deployment configuration.

18. The method of claim 17, wherein if at least two external airbags of the one or more external airbags are deployed, the at least two external airbags are inflated to different pressures.

19. The method of claim 10, wherein the plurality of external airbags of the autonomous further include one or more third external airbags configured for at least one of a first side and a second side of the autonomous vehicle.

20. The method of claim 10, wherein based on determining that the object is a non-human object, the method further comprising:

determining a size of the non-human object;
based on the size of the non-human object satisfying one or more size threshold, determining the deployment configuration for the one or more external airbags of the plurality of external airbags of the autonomous vehicle; and selectively deploying the one or more external airbags of the plurality of external airbags for the autonomous vehicle based on the deployment configuration.

21. The method of claim 10, wherein based on determining that the object is a non-human object, the method further comprising:
determining whether the object is an animate object or an inanimate object.

22. The method of claim 21, wherein based on determining that the object is an animate object, the method further comprising determining the deployment configuration for the one or more external airbags of the plurality of external airbags of the autonomous vehicle based on whether the animate object satisfies the height threshold.

23. An airbag deployment system for an autonomous vehicle, comprising:
a plurality of external airbags;
at least one memory element for storing data; and
at least one processor for executing instructions associated with the data, wherein executing the instructions causes the airbag deployment system to perform operations, comprising:
detecting an object with which a collision is to occur for a forward direction of travel of the autonomous vehicle;
determining a deployment configuration for one or more external airbags of the plurality of external airbags for the autonomous vehicle based, at least in part, on whether a height of the object satisfies a height threshold, wherein the plurality of external airbags of the autonomous vehicle include one or more first external airbags configured for a front surface body portion of the autonomous vehicle and one or more second external airbags configured for an uppermost top surface body portion of the autonomous vehicle; and
selectively deploying the one or more external airbags of the plurality of external airbags for the autonomous vehicle based on the deployment configuration, wherein the one or more second external airbags configured for the uppermost top surface body portion of the autonomous vehicle are selectively deployed based on whether the height of the object satisfies or does not satisfy the height threshold for the collision that is to occur with the object for the forward direction of travel of the autonomous vehicle.

24. The airbag deployment system of claim 23, wherein determining the deployment configuration for the one or more external airbags of the autonomous vehicle further comprises:
based on determining that the height of the object does not satisfy the height threshold:
determining that at least one first external airbag of the one or more first external airbags configured for the front surface body portion of the autonomous vehicle is to be deployed and determining a first deployment configuration for the at least one first external airbag; and
determining that at least one second external airbag of the one or more second external airbags configured for the uppermost top surface body portion of the autonomous vehicle is not to be deployed.

25. The airbag deployment system of claim 23, wherein determining the deployment configuration for the one or more external airbags of the autonomous vehicle further comprises:
based on determining that the height of the object satisfies the height threshold:
determining that at least one first external airbag of the one or more first external airbags configured for the front surface body portion of the autonomous vehicle is to be deployed and determining a first deployment configuration for the at least one first external airbag; and
determining that at least one second external airbag of the one or more second external airbags configured for the uppermost top surface body portion of the autonomous vehicle is to be deployed and determining at least one deployment configuration for the at least one second external airbag.

26. The method of claim 1, wherein at least one of the one or more second external airbags are configured for the uppermost top surface body portion and an uppermost front surface body portion of the autonomous vehicle.

27. The method of claim 10, wherein at least one of the one or more second external airbags are configured for the uppermost top surface body portion and an uppermost front surface body portion of the autonomous vehicle.

28. The method of claim 1, wherein the one or more first external airbags configured for the front surface body portion of the autonomous vehicle include a first front surface external airbag configured for an upper front surface body portion of the autonomous vehicle and a second front surface external airbag configured for a lower front surface body portion of the autonomous vehicle.

29. The method of claim 28, wherein determining the deployment configuration for the one or more external airbags of the plurality of external airbags of the autonomous vehicle further comprises:
based on determining that the height of the object does not satisfy the height threshold:
determining that the first front surface external airbag configured for the upper front surface body portion of the autonomous vehicle is to be deployed and determining a first deployment configuration for the first front surface external airbag;
determining that the second front surface external airbag configured for the lower front surface body portion of the autonomous vehicle is to be deployed and determining a first deployment configuration for the first front surface external airbag; and
determining that at least one second external airbag of the one or more second external airbags configured for the uppermost top surface body portion of the autonomous vehicle is not to be deployed.

30. The method of claim 28, wherein determining the deployment configuration for the one or more external airbags of the plurality of external airbags of the autonomous vehicle further comprises:
based on determining that the height of the object does satisfy the height threshold:
determining that the first front surface external airbag configured for the upper front surface body portion of the autonomous vehicle is to be deployed and determining a first deployment configuration for the first front surface external airbag;
determining that the second front surface external airbag configured for the lower front surface body portion of the autonomous vehicle is to be deployed and determining a first deployment configuration for the first front surface external airbag; and
determining that at least one second external airbag of the one or more second external airbags configured for the uppermost top surface body portion of the autonomous vehicle is to be deployed and determining at least one deployment configuration for the at least one second external airbag.

* * * * *